(12) United States Patent
Jang et al.

(10) Patent No.: US 11,747,655 B2
(45) Date of Patent: Sep. 5, 2023

(54) SEGMENTED POLARIZATION SELECTIVE DEVICE

(71) Applicant: Meta Platforms Technologies, LLC, Menlo Park, CA (US)

(72) Inventors: Changwon Jang, Seattle, WA (US); Afsoon Jamali, Issaquah, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 181 days.

(21) Appl. No.: 17/122,311

(22) Filed: Dec. 15, 2020

(65) Prior Publication Data

US 2022/0187631 A1    Jun. 16, 2022

(51) Int. Cl.
*G02F 1/01*    (2006.01)
*G02F 1/139*    (2006.01)
*G02F 1/133*    (2006.01)

(52) U.S. Cl.
CPC .......... *G02F 1/0136* (2013.01); *G02F 1/1396* (2013.01); *G02F 1/13306* (2013.01)

(58) Field of Classification Search
CPC ..................................................... G02F 1/0136
See application file for complete search history.

(56) References Cited

U.S. PATENT DOCUMENTS

| | | | |
|---|---|---|---|
| 10,379,419 B1 * | 8/2019 | Lu | G02B 27/286 |
| 2019/0318677 A1 * | 10/2019 | Lu | G02B 27/0093 |
| 2019/0318706 A1 * | 10/2019 | Peng | G09G 3/007 |

* cited by examiner

*Primary Examiner* — Edmond C Lau
(74) *Attorney, Agent, or Firm* — MILLBURN IP PLLC

(57) ABSTRACT

A device includes a segmented polarization switch including a plurality of polarization switch segments. The device also includes a polarization selective optical element ("PSOE") optically coupled to the segmented polarization switch and including a plurality of polarization selective segments. The device further includes a controller configured to control the polarization switch segments to operate in a switching state or a non-switching state to control optical states of the polarization selective segments.

20 Claims, 21 Drawing Sheets

SEGMENTED POLARIZATION SELECTIVE DEVICE

TECHNICAL FIELD

The present disclosure generally relates to devices and, more specifically, to a segmented polarization selective device.

BACKGROUND

Polarization selective optical elements, such as polarization selective lenses, gratings, and deflectors, etc., have gained increasing interests in optical device and system applications, for example, in beam steering devices, waveguides, and displays. Polarization selective optical elements may be fabricated based on isotropic or anisotropic materials, and may include suitable sub-wavelength structures, liquid crystals, photo-refractive holographic materials, or a combination thereof. Pancharatnam-Berry phase ("PBP") elements and polarization volume hologram ("PVH") elements are two types of polarization selective optical elements that provide a polarization selective optical response. A PBP element may modulate a circularly polarized light based on a phase profile provided through a geometric phase. A PVH element may modulate a circularly polarized light based on Bragg diffraction. An optic axis of a PVH element or a PBP element may have a spatially varying orientation in at least one in-plane direction. The optic axis of a PVH element or a PBP element may also have a spatially varying orientation in an out-of-plane direction. PBP elements and PVH elements have features such as flatness, compactness, high efficiency, high aperture ratios, absence of on-axis aberrations, switching capability, flexible design, simple fabrication, and low cost, etc. Thus, PBP elements and PVH elements can be implemented in various applications such as portable or wearable optical devices or systems.

SUMMARY OF THE DISCLOSURE

Consistent with a disclosed embodiment of the present disclosure, a device is provided. The device includes a segmented polarization switch including a plurality of polarization switch segments. The device also includes a polarization selective optical element ("PSOE") optically coupled to the segmented polarization switch and including a plurality of polarization selective segments. The device further includes a controller configured to control the polarization switch segments to operate in a switching state or a non-switching state to control optical states of the polarization selective segments.

Consistent with a disclosed embodiment of the present disclosure, a system is provided. The system includes a light source configured to output a light. The system also includes a polarization selective device optically coupled to the light source and configured to modulate the light and output a modulated light to illuminate an object. The polarization selective device includes a segmented polarization switch including a plurality of polarization switch segments. The polarization selective device also includes a polarization selective optical element ("PSOE") optically coupled to the segmented polarization switch and including a plurality of polarization selective segments. The polarization selective device also includes a controller configured to control the polarization switch segments to operate in a switching state or a non-switching state to control optical states of the polarization selective segments. The system also includes an imaging device configured to receive the modulated light reflected by the object and generate an image of the object based on the received modulated light.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
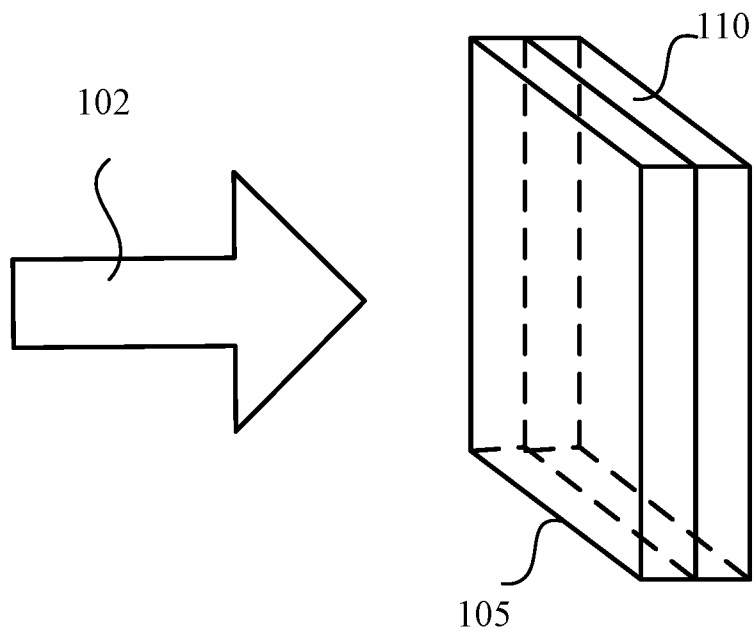
FIG. 1A schematically illustrates a three-dimensional ("3D") view of a polarization selective device, according to an embodiment of the present disclosure.
Figure 1A:
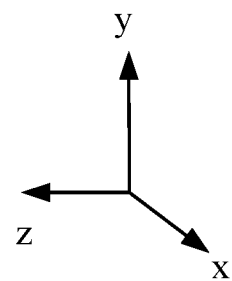

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable.

The phrases "in-plane direction," "in-plane orientation," "in-plane rotation," "in-plane alignment pattern," and "in-plane pitch" refer to a direction, an orientation, a rotation, an alignment pattern, and a pitch in a plane of a film or a layer (e.g., a surface plane of the film or layer, or a plane parallel to the surface plane of the film or layer), respectively. The term "out-of-plane direction" or "out-of-plane orientation" indicates a direction or orientation that is non-parallel to the plane of the film or layer (e.g., perpendicular to the surface plane of the film or layer, e.g., perpendicular to a plane parallel to the surface plane). For example, when an "in-plane" direction or orientation refers to a direction or orientation within a surface plane, an "out-of-plane" direction or orientation may refer to a thickness direction or orientation perpendicular to the surface plane, or a direction or orientation that is not parallel with the surface plane.

The term "orthogonal" as used in "orthogonal polarizations" or the term "orthogonally" as used in "orthogonally polarized" means that an inner product of two vectors representing the two polarizations is substantially zero. For example, two lights with orthogonal polarizations or two orthogonally polarized lights may be two linearly polarized lights with polarizations in two orthogonal directions (e.g., an x-axis direction and a y-axis direction in a Cartesian coordinate system) or two circularly polarized lights with opposite handednesses (e.g., a left-handed circularly polarized light and a right-handed circularly polarized light).

In the present disclosure, an angle of a beam (e.g., a diffraction angle of a diffracted beam or an incidence angle of an incident beam) with respect to a normal of a surface can be defined as a positive angle or a negative angle, depending on the angular relationship between a propagating direction of the beam and the normal of the surface. For example, when the propagating direction of the beam is clockwise from the normal, the angle of the propagating direction may be defined as a positive angle, and when the propagating direction of the beam is counter-clockwise from the normal, the angle of the propagating direction may be defined as a negative angle.

The present disclosure provides a device or system configured to steer an input light into a plurality of directions. In some embodiments, the device may include a segmented polarization switch including a plurality of polarization switch segments. The device may include a polarization selective optical element ("PSOE") optically coupled to the segmented polarization switch and including a plurality of polarization selective segments. The device may include a controller configured to control the polarization switch segments to operate in a switching state or a non-switching state to control optical states of the polarization selective segments. In some embodiments, the segmented polarization switch may include a segmented switchable half-wave plate ("SHWP"), and the polarization switch segments may include SHWP segments. In some embodiments, the device may include a plurality of power sources configured to supply a plurality of voltages to the plurality of SHWP segments. The controller may be configured to control the power sources to supply the voltages to configure the SHWP segments to operate in the switching state or the non-switching state. In some embodiments, the PSOE may include at least one of sub-wavelength structures (e.g., metamaterial), a birefringent material, or a photo-refractive holographic material. In some embodiments, the PSOE may include a birefringent material, an optic axis of the birefringent material being configured with an orientation spatially varying in at least one in-plane direction.

In some embodiments, the PSOE may be a Pancharatnam-Berry phase ("PBP") element, and the polarization selective segments may be PBP segments. In some embodiments, at least one of the PBP segments may be configured to operate in a first optical state to provide a first optical response to a first input light having a first polarization, and operate in a second optical state to provide a second optical response different from the first optical response to a second input light having a second polarization, the first polarization being orthogonal to the second polarization. In some embodiments, the at least one of the PBP segment may be configured to operate in a neutral optical state to provide a substantially same optical response to the first input light having the first polarization and to the second input light having the second polarization. In some embodiments, the device may include a plurality of first power sources configured to supply a plurality of first voltages to the plurality of polarization switch segments. The device may also include a plurality of second power sources configured to supply a plurality of second voltages to the plurality of PBP segments. The controller may be configured to control the first power sources to supply the first voltages to configure the polarization switch segments to operate in the switching state or the non-switching state, and to control the second power sources to supply the second voltages to configure the PBP segments to operate in the first optical state or the second optical state.

In some embodiments, the PBP segment may include a birefringent film, and an orientation of an optic axis of the birefringent film may vary periodically with a uniform in-plane pitch in the at least one in-plane direction. In some embodiments, the PBP segment may include a birefringent film, and an orientation of an optic axis of the birefringent film may vary in at least two opposite in-plane directions from a center of the PBP segment to opposite peripheries of the PBP segment with a varying in-plane pitch. In some embodiments, for an input light having a planar wavefront and substantially normally incident onto the device, the PSOE and the segmented polarization switch may be configured to output a plurality of output lights propagating in different directions at different regions across a predetermined clear aperture. In some embodiments, for an input light having a planar wavefront and substantially normally incident onto the device, the PSOE and the segmented polarization switch are configured to non-uniformly vary local wavefronts of a plurality of portions of an output light at a plurality of regions across a predetermined clear aperture.

In some embodiments, the segmented polarization switch may be a first segmented polarization switch, the polarization switch segments are first polarization switch segments, and the device may further include a second segmented polarization switch optically coupled to the PSOE and including a plurality of second polarization switch segments, the second segmented polarization switch being configured to receive lights output from the PSOE. The device may also include a plurality of power sources configured to supply a plurality of voltages to the plurality of second polarization switch segments. The controller may be configured to control the power sources to supply the voltages to configure the second polarization switch segments to operate in the switching state or the non-switching state.

In some embodiments, the PSOE may be a first PSOE, the polarization selective segments may be first polarization selective segments, and the device may further include a second PSOE optically coupled to the first PSOE and including a plurality of second polarization selective segments, the second PSOE being configured to receive lights output from the first PSOE.

In some embodiments, the PSOE may be a first PSOE, the polarization selective segments may be first polarization selective segments, and the device may further include a second segmented polarization switch optically coupled to the first PSOE and including a plurality of second polarization switch segments, the second segmented polarization switch being configured to receive lights output from the first PSOE. The device may also include a second PSOE optically coupled to the second segmented polarization switch and including a plurality of second polarization selective segments, the second PSOE being configured to receive lights output from the second segmented polarization switch.

The present disclosure also provides a system including a light source configured to output a light. The system may also include a polarization selective device optically coupled to the light source and configured to modulate the light and output a modulated light to illuminate an object. The polarization selective device may include a segmented polarization switch including a plurality of polarization switch segments. The polarization selective device may also include a polarization selective optical element ("PSOE") optically coupled to the segmented polarization switch and including a plurality of polarization selective segments. The polarization selective device may also include a controller configured to control the polarization switch segments to operate in a switching state or a non-switching state to control optical states of the polarization selective segments. The system may also include an imaging device configured to receive the modulated light reflected by the object and generate an image of the object based on the received modulated light.

In some embodiments, the segmented polarization switch may include a segmented switchable half-wave plate ("SHWP"), and the polarization switch segments may include SHWP segments. In some embodiments, the PSOE may include at least one of sub-wavelength structures, a birefringent material, or a photo-refractive holographic material. In some embodiments, the PSOE may include a birefringent material, an optic axis of the birefringent material being configured with an orientation spatially varying in at least one in-plane direction.

Figure 1B:
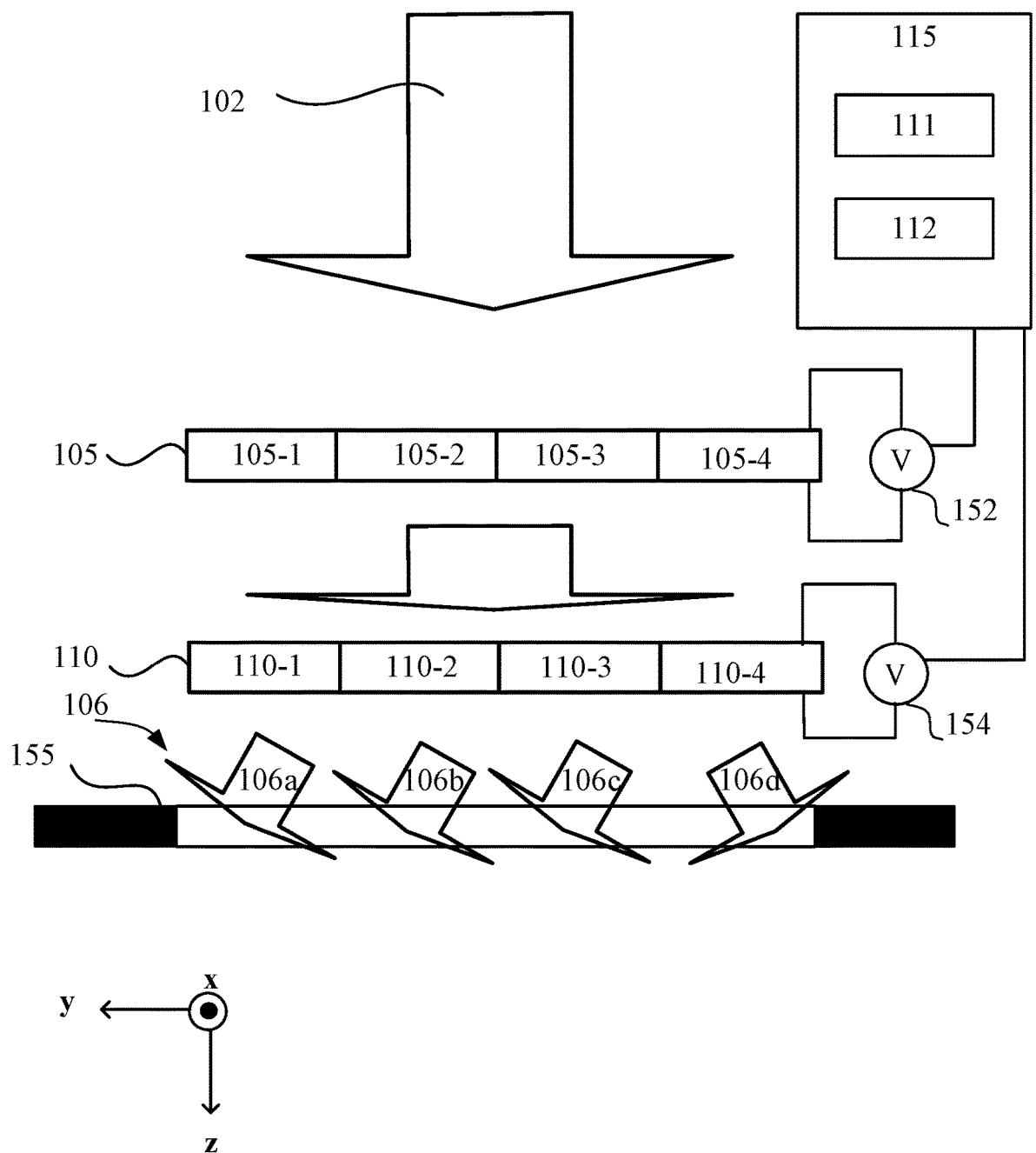
FIG. 1B schematically illustrates a cross-sectional view of the polarization selective device shown in FIG. 1A, according to an embodiment of the present disclosure.

FIG. 1A illustrates a schematic three-dimensional ("3D") view of a polarization selective device 100 with an input light 102 incident onto the polarization selective device 100 along a -z-axis, according to an embodiment of the present disclosure. FIG. 1B schematically illustrates a cross-sectional view of the polarization selective device 100 shown in FIG. 1A, according to an embodiment of the present disclosure. Although the polarization selective device 100 is shown as a rectangular plate shape for illustrative purposes, the polarization selective device 100 may have any suitable shape, such as a circular shape. In some embodiments, one or both surfaces along the light propagating path of the input light 102 may have curved shapes.

As shown in FIGS. 1A and 1B, the polarization selective device 100 may include a segmented waveplate 105, a polarization selective optical element ("PSOE") 110 optically coupled to the segmented waveplate 105, and a controller 115. The segmented waveplate 105 may include a plurality of waveplate segments arranged in an array, e.g., a one-dimensional ("1D") array or a two-dimensional ("2D") array. For discussion and illustrative purposes, FIG. 1B shows that the segmented waveplate 105 includes four waveplate segments 105-1, 105-2, 105-3, and 105-4 arranged in a 1D array. Although not shown, in some embodiments, the segmented waveplate 105 may include any suitable number of waveplate segments arranged in a 1D or 2D array, such as two, three, five, six, or seven, etc.

The waveplate segments 105-1, 105-2, 105-3, and 105-4 may be configured to have a substantially same size or different sizes. In some embodiments, the segmented waveplate 105 may function as a segmented switchable halfwave plate ("SHWP") 105 for the input light 102 having a wavelength within a predetermined wavelength range and an incidence angle within a predetermined incidence angle range. Accordingly, the waveplate segments 105-1, 105-2, 105-3, and 105-4 may function as SHWP segments 105-1, 105-2, 105-3, and 105-4, respectively.

In some embodiments, the SHWP segment 105-1, 105-2, 105-3, or 105-4 may be configured to have two operation states: a switching state and a non-switching state. In some embodiments, the input light 102 may be a polarized light with a predetermined polarization. The SHWP segment 105-1, 105-2, 105-3, or 105-4 operating in the switching state may be configured to switch a polarization of a portion of the input light 102 incident onto the SHWP segment to an orthogonal polarization. That is, the SHWP segment 105-1, 105-2, 105-3, or 105-4 operating in the switching state may be configured to switch a local polarization of the input light 102 incident onto the SHWP segment to an orthogonal polarization. The SHWP segment 105-1, 105-2, 105-3, or 105-4 operating in the non-switching state may maintain the polarization of the portion of the input light 102. That is, the SHWP segment 105-1, 105-2, 105-3, or 105-4 operating in the switching state may be configured to maintain a local polarization of the input light 102 incident onto the SHWP segment. In some embodiments, the SHWP segments 105-1, 105-2, 105-3, and 105-4 may be individually or independently switchable between the switching state and the non-switching state, thereby individually or independently controlling polarizations of the portions of the input light 102 before the portions of the input light 102 are incident onto the PSOE 110 (or local polarization of the input light 102 before the input light 102 is incident onto the PSOE 110). In other words, the SHWP segments 105-1, 105-2, 105-3, and 105-4 may function as polarization switches disposed at a light incidence side of the PSOE 110 to individually or independently control polarizations of portions of the input light 102, before the portions of the input light 102 are incident onto the PSOE 110. In some embodiments, the SHWP segment 105-1, 105-2, 105-3, or 105-4 may also be referred to a polarization switch segment that is disposed at a light incidence side of the PSOE 110. Accordingly, the segmented waveplate 105 may also be referred to a segmented polarization switch.

In some embodiments, the SHWP segment 105-1, 105-2, 105-3, or 105-4 may include a liquid crystal ("LC") layer. An external electric field (e.g., a voltage) may be applied to the LC layer to change the orientations of LC molecules, thereby controlling the SHWP segment 105-1, 105-2, 105-3, or 105-4 to operate in the switching state or the non-switching state. For example, the SHWP segment 105-1, 105-2, 105-3, or 105-4 may operate in the switching state when an externally applied voltage is lower than or equal to a predetermined voltage, or operate in the non-switching state when the externally applied voltage is higher than the predetermined voltage (and sufficiently high) to reorient the LC molecules along an electric field direction. In some embodiments, the SHWP segments 105-1, 105-2, 105-3, and 105-4 may be electrically coupled with corresponding power sources. For discussion purpose, FIG. 1B merely shows one power source 152 electrically coupled with the SHWP segment 105-4. In some embodiments, the power source 152 may also be electrically coupled with the other SHWP segments. In some embodiments, each SHWP segment may be electrically coupled with a separate power source. For discussion purposes, the SHWP segments 105-1, 105-2, 105-3, and 105-4 are presumed to be electrically coupled with the power source 152, which may supply a same voltage to the SHWP segments, or may supply individual, different voltages to the SHWP segments. The controller 115 may control the output of the power source 152 to control the electric fields in the SHWP segments 105-1, 105-2, 105-3, and 105-4, thereby controlling the operation states of the SHWP segments 105-1, 105-2, 105-3, and 105-4.

The PSOE 110 may include suitable sub-wavelength structures, a birefringent or optically anisotropic material (e.g., an LC material), a photo-refractive holographic material, or any combination thereof. In some embodiments, the PSOE 110 may include a PBP element (also referred to as 110 for discussion purposes). PBP is a geometric phase ("GP") related to changes in the polarization state experienced by a beam while the beam propagates in a birefringent material. Such a geometric phase may be proportional to a solid angle defined by the polarization state along the beam propagation path on the Poincarè sphere. In a birefringent material, a transverse gradient of PBP may be induced by local rotations of the optic axis. When the thickness of a birefringent film corresponds to a half-wave plate phase difference between the ordinary and the extraordinary beams, the PBP between two points across a beam profile may be equal to two times of the relative rotation of the optic axis at the two points. Thus, the wavefront of the beam may be polarization dependent and may be configured by a continuous spatial rotation of the optic axis in at least one in-plane direction. The PBP element may provide a substantially high diffraction efficiency due to a continuous phase profile generated based on the orientation of the optic axis of the birefringent film.

For example, the PBP element 110 may include a birefringent material (e.g., an LC material) disposed in a form of a birefringent film. In some embodiments, an optic axis of the birefringent film may be configured with a spatially varying orientation in at least one in-plane direction to provide a polarization selective optical response. For example, the optic axis of the birefringent film may periodically or non-periodically vary in at least one in-plane linear direction, at least one in-plane radial direction, at least one in-plane circumferential (e.g., azimuthal) direction, or a combination thereof. In some embodiments, the optic axis of the birefringent film may also be configured with a spatially varying orientation in an out-of-plane direction. For example, the optic axis of the birefringent film may twist in a helical fashion in the out-of-plane direction. In some embodiments, the orientation of the optic axis of the birefringent film at a local point of the birefringent film may be determined by orientations of optically anisotropic molecules at the local point of the birefringent film. For example, the optically anisotropic molecules may be configured with a three-dimensional ("3D") orientation pattern, which may enable the PBP element 110 to provide a polarization selective optical response. In some embodiments, the optically anisotropic molecules may be configured with an in-plane orientation pattern. In some embodiments, the out-of-plane orientations of the optically anisotropic molecules may also be configured, e.g., the orientations of the optically anisotropic molecules may change in a helical fashion in the out-of-plane direction.

The PBP element 110 may be fabricated based on an isotropic or anisotropic material. In some embodiments, the PBP element 110 may be fabricated based on a birefringent medium, e.g., an LC material, which may have an intrinsic orientational order of optically anisotropic molecules that can be locally controlled. In some embodiments, the PBP element 110 may be fabricated based on a photosensitive polymer, such as an amorphous polymer, an LC polymer, etc., which may generate an induced (e.g., photo-induced) optical anisotropy and/or an induced (e.g., photo-induced) optic axis orientation when subjected to a polarized light irradiation.

The PBP element 110 may include a plurality of PBP segments arranged in an array, e.g., a 1D array or 2D array. For discussion and illustrative purposes, FIG. 1B shows that the PBP element 110 includes four PBP segments 110-1, 110-2, 110-3, and 110-4 arranged in a 1D array. The PBP element 110 may include any suitable number of PBP segments, such as two, three, five, six, or seven, etc. The PBP segment 110-1, 110-2, 110-3, or 110-4 may have a substantially same size or different sizes. The PBP segment 110-1, 110-2, 110-3, or 110-4 may be circular polarization selective and configured to provide a polarization selective optical response.

The PBP segment 110-1, 110-2, 110-3, or 110-4 may be a passive PBP segment or an active PBP segment. A passive PBP segment may be configured to operate in a first optical state to provide a first optical response to an input light having a first polarization (e.g., a circularly polarized input light having a first handedness), and operate in a second optical state to provide a second optical response (different from the first optical response) to an input light having a second polarization (e.g., a circularly polarized input light having a second handedness opposite to the first handedness). In some embodiments, the first polarization may be orthogonal to the second polarization. The first optical state and the second optical state may be non-neutral optical states. Thus, through controlling a polarization of an input light of the passive PBP segment, the passive PBP segment may be configured to operate in the first optical state or the second optical state.

An active PBP segment may be electrically coupled to a power source (e.g., 154) configured to provide a voltage (and hence, an electric field) to the active PBP segment. An active PBP segment may be configured to operate in the first optical state or the second optical state when the voltage applied to the active PBP segment is lower than a predetermined threshold. An active PBP segment may be configured to operate in a third optical state (e.g., a neutral state) in addition to the first optical state and the second optical state. In some embodiments, when the voltage applied to the active PBP segment is sufficiently high, the active PBP segment may operate in the third optical state (e.g., a neutral state) to provide a third optical response to an input light independent of the polarization of the input light. Thus, through controlling a polarization of an input light of the active PBP segment and a voltage applied to the active PBP segment, the active PBP segment may be configured to operate in the first optical state, the second optical state, or the third optical state. In some embodiments, the passive or active PBP segment operating in the first optical state or the second optical state may be configured to reverse a handedness of a circularly polarized input light. In some embodiments, the active PBP segment operating in the third optical state (e.g., a neutral state) may substantially not affect the wavefront and the propagation direction of a circularly polarized input light, and may reverse or maintain a handedness of the circularly polarized input light.

The SHWP segments 105-1, 105-2, 105-3, and 105-4 may be optically coupled to (or aligned with) with corresponding PBP segments 110-1, 110-2, 110-3, and 110-4, respectively. In some embodiments, the SHWP segment 105-1, 105-2, 105-3, or 105-4 and the corresponding PBP segment 110-1, 110-2, 110-3, or 110-4 may have a substantially same size. In some embodiments, the controller 115 may individually or independently control the operation states of the SHWP segments 105-1, 105-2, 105-3, and 105-4 to control polarizations of the portions of the input light 102 before the portions of the input light 102 are incident onto the corresponding PBP segments 110-1, 110-2, 110-3, and 110-4. For example, the controller 115 may individually or independently control the SHWP segments 105-1, 105-2, 105-3, and 105-4 to operate in a switching state or a non-switching state to control the polarizations of the portions of the input light 102 before the portions of the input light 102 are incident onto the corresponding PBP segments 110-1, 110-2, 110-3, and 110-4. Thus, through at least controlling the polarizations of the portions of the input light 102 before the portions of the input light 102 are incident onto the PBP segments 110-1, 110-2, 110-3, and 110-4, the controller 115 may individually or independently control the optical states of the PBP segments 110-1, 110-2, 110-3, and 110-4. The optical states of the PBP segments may be controlled to be the same or to be different. Any desirable combinations of the optical states of the PBP segments may be achieved.

In some embodiments, the PBP segments 110-1, 110-2, 110-3, and 110-4 may be passive PBP segments. Through controlling the polarizations of the portions of the input light 102 before the portions of the input light 102 are incident onto the PBP segments 110-1, 110-2, 110-3, and 110-4, the controller 115 may individually or independently control the optical states of the PBP segments 110-1, 110-2, 110-3, and 110-4. For example, through controlling the polarizations of the portions of the input light 102 before the portions of the input light 102 are incident onto the passive PBP segments 110-1, 110-2, 110-3, and 110-4, the controller 115 may individually or independently control the PBP segments 110-1, 110-2, 110-3, and 110-4 to operate in the first optical state or the second optical state.

In some embodiments, the PBP segments 110-1, 110-2, 110-3, and 110-4 may include at least one active PBP segment. The controller 115 may individually or independently control the optical states of the PBP segments 110-1, 110-2, 110-3, and 110-4, through controlling the polarizations of the portions of the input light 102 before the portions of the input light 102 are incident onto the PBP segments 110-1, 110-2, 110-3, and 110-4 and controlling the volage applied to the at least one active PBP segment. For example, through controlling the polarizations of the portions of the input light 102 before the portions of the input light 102 are incident onto the passive PBP segments 110-1, 110-2, 110-3, and 110-4 and the volage applied to the at least one active PBP segment, the controller 115 may individually or independently control the PBP segments 110-1, 110-2, 110-3, and 110-4 to operate in the first optical state, the second optical state, or the third optical state (e.g., a neutral state).

In some embodiments, the PBP segments 110-1, 110-2, 110-3, and 110-4 may be active or passive PBP segments. In some embodiments, the PBP segments 110-1, 110-2, 110-3, and 110-4 may include at least one active PBP segment and at least one passive PBP segment. For discussion purpose, FIG. 1B merely shows that the PBP segment 110-4 is electrically coupled with the power source 154. In some embodiments, the power source 154 may be electrically coupled to other PBP segments. The power source 154 may supply a substantially same voltage or different voltages to the PBP segments. In some embodiments, different power sources may be electrically coupled to the PBP segments 110-1 to 110-4, to independently supply voltages to the PBP segments. In some embodiments, the PBP segments 110-1, 110-2, 110-3, and 110-4 may be transmissive or reflective PBP segments. In some embodiments, the PBP segments 110-1, 110-2, 110-3, and 110-4 may include at least one transmissive PBP segment and at least one reflective PBP segment.

In some embodiments, the PBP segments 110-1, 110-2, 110-3, and 110-4 may function as a same type of PBP optical element. For example, the PBP segments 110-1, 110-2, 110-3, and 110-4 may function as PBP gratings, PBP lenses, or PBP prisms, etc. When the PBP segments 110-1, 110-2, 110-3, and 110-4 function as a same type of PBP optical element, the PBP segments 110-1, 110-2, 110-3, and 110-4 may have the same polarization selectivity or different polarization selectivities. For example, when the PBP segments 110-1, 110-2, 110-3, and 110-4 have the same polarization selectivity, the PBP segments 110-1, 110-2, 110-3, and 110-4 may be configured to operate in the first optical state for a circularly polarized input light having the first handedness or operate in the second optical state for a circularly polarized input light having the second handedness. When the PBP segments 110-1, 110-2, 110-3, and 110-4 have different polarization selectivities, at least one of the PBP segments 110-1, 110-2, 110-3, and 110-4 may be configured to operate in the first optical state for a circularly polarized input light having the first handedness or operate in the second optical state for a circularly polarized input light having the second handedness. In some embodiments, at least one of the PBP segments 110-1, 110-2, 110-3, and 110-4 may be configured to operate in the first optical state for a circularly polarized input light having the second handedness or operate in the second optical state for a circularly polarized input light having the first handedness. In some embodiments, the PBP segments 110-1, 110-2, 110-3, and 110-4 may function as different types of PBP optical elements. For example, at least one of the PBP segments 110-1, 110-2, 110-3, and 110-4 may function as a PBP grating, and at least one of the PBP segments 110-1, 110-2, 110-3, and 110-4 may function as a PBP lens.

In some embodiments, the polarization selective device 100 may further include one or more other optical elements disposed at a light incidence side of the segmented waveplate 105 to configure the input light 102 to have a predetermined polarization. For example, in some embodiments, the input light 102 may be an unpolarized light, and the polarization selective device 100 may further include a circular polarizer (or a combination of a linear polarizer and a quarter waveplate) disposed at the light incidence side of the segmented waveplate 105. The circular polarizer (or the combination of a linear polarizer and a quarter waveplate) may be configured to convert an unpolarized light to a circularly polarized light.

The controller 115 may be communicatively coupled with the segmented SHWP 115 and/or the PBP element 110, and may control the operations of the segmented SHWP 115 and/or the PBP element 110. The controller 115 may include a processor or processing unit 111. The processor may by any suitable processor, such as a central processing unit ("CPU"), a graphic processing unit ("GPU"), etc. The controller 115 may include a storage device 112. The storage device 112 may be a non-transitory computer-readable medium, such as a memory, a hard disk, etc. The storage device 112 may be configured to store data or information, including computer-executable program instructions or codes, which may be executed by the processor 111 to perform various controls or functions of the methods or processes disclosed herein.

Through individually or independently controlling the operation states of the SHWP segments 105-1, 105-2, 105-3, and 105-4 and individually or independently controlling the voltages applied to the active PBP segments (when the PBP segments 110-1, 110-2, 110-3, and 110-4 include active PBP segments), local output lights (or local optical outputs) 106a, 106b, 106c, and 106d output from the PBP segments 110-1, 110-2, 110-3, and 110-4 may be individually or independently configurable. For example, the light propagation directions, the polarizations, and/or the wavefronts, etc., of the local output lights 106a, 106b, 106c, and 106d output from the PBP segments 110-1, 110-2, 110-3, and 110-4 may be individually or independently configurable. In some embodiments, an overall output light (or optical output) 106 of the polarization selective device 100 may be a combination of the local output lights 106a, 106b, 106c, and 106d output from the PBP segments 110-1, 110-2, 110-3, and 110-4. Thus, local light propagation directions, local polarizations, and/or local wavefronts of the overall output light 106 of the polarization selective device 100 may be individually or independently configurable.

In some embodiments, the light propagation directions of the local output lights 106a, 106b, 106c, and 106d may be non-parallel to each other. That is, when the input light 102 is incident onto the SHWP segments 105-1, 105-2, 105-3, and 105-4 with substantially parallel local light propagation directions (e.g., in a z-axis direction), the polarization selective device 100 may be configured to non-uniformly vary the light propagation directions of the local output lights 106a, 106b, 106c, and 106d across a predetermined clear aperture 155. For example, as shown in FIG. 1B, the local output lights 106a, 106b, and 106c output from the PBP segments 110-1, 110-2 and 110-3 may have light propagation directions having a positive angle with respect to a surface normal of the PBP element 110 (e.g., clockwise from the surface normal). The local output light 106d output from the PBP segment 110-4 may have a light propagation direction having a negative angle with respect to the surface normal of the PBP element 110 (e.g., counter-clockwise from the surface normal).

In some embodiments, through individually or independently controlling the operation states of the SHWP segments 105-1, 105-2, 105-3, and 105-4 and individually or independently controlling the voltages applied to the active PBP segments (when the PBP segments 110-1, 110-2, 110-3, and 110-4 include active PBP segments), the overall output light 106 of the polarization selective device 100 may be configured to have a desirable wavefront across the predetermined clear aperture 155. The polarization selective device 100 disclosed herein may be implemented into applications in which local light propagation directions of a light are desired to non-uniformly vary across the predetermined clear aperture 155. The polarization selective device 100 may be implemented in applications for, e.g., aberration correction, phase compensation, beam steering, Light Detection and Ranging ("Lidar"), etc.

Figure 2A:
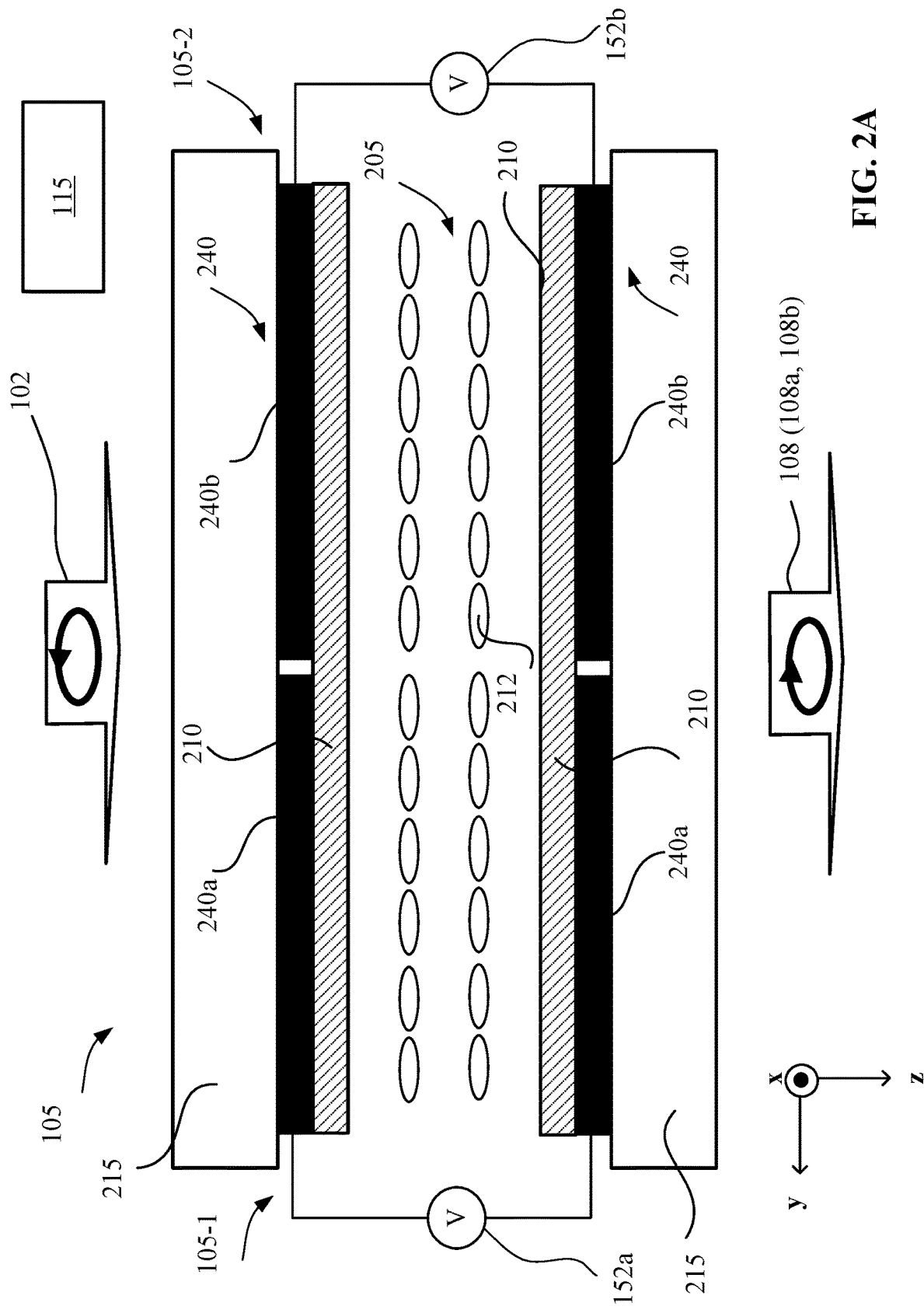
FIGS. 2A and 2B schematically illustrate diagrams of a segmented waveplate included in a polarization selective device, according to an embodiment of the present disclosure.
Figure 2B:
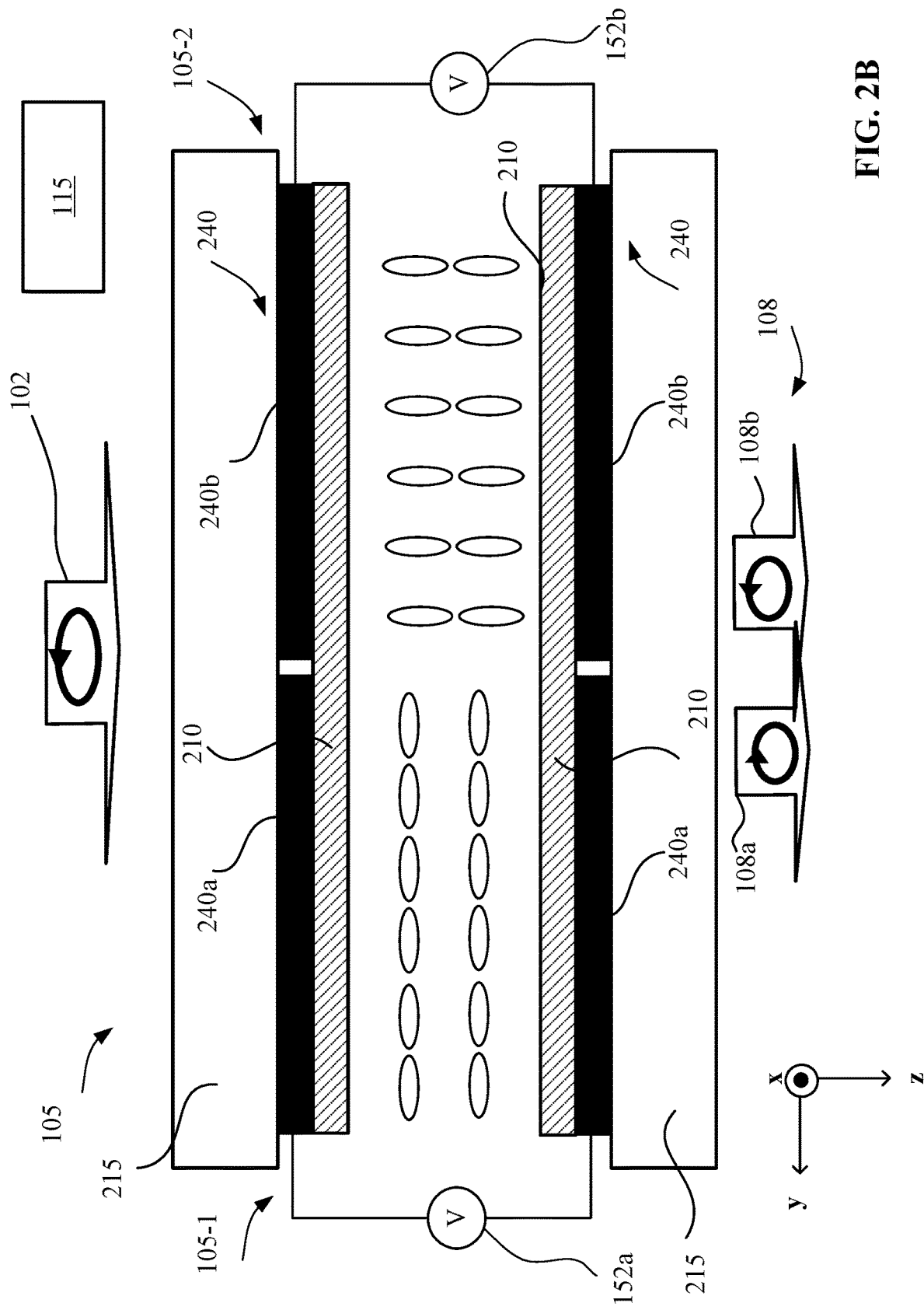

FIGS. 2A and 2B schematically illustrate diagrams of the segmented waveplate 105 (e.g., segment SHWP) included in the polarization selective device 100 shown in FIGS. 1A and 1B, according to an embodiment of the present disclosure. For discussion purposes, FIGS. 2A and 2B merely show the waveplate segments 105-1 and 105-2 (e.g., SHWP segments) of the segmented waveplate 105 (e.g., segment SHWP). Additional segments that may be included in the segmented waveplate 105 are not shown in FIG. 2A and FIG. 2B. The connection between the controller 115 and the other elements included in the polarization selective device 100 is not shown.

As shown in FIG. 2A, the segmented waveplate 105 may include two substates 215 and an LC layer 205 disposed between the two substates 215. Each substrate 215 may be provided with an alignment layer 210 and a conductive electrode layer 240 disposed between the alignment layer 210 and the substrate 215. The substrate 215 may be transparent in one or more predetermined wavelength bands or spectra, e.g., the ultraviolet ("UV") spectrum (or a portion of the UV spectrum), the visible spectrum (or a portion of the visible spectrum), or the infrared ("IR") spectrum (or a portion of the IR spectrum). The substrate 215 may be fabricated based on an organic material and/or an inorganic material that is substantially transparent to lights having wavelengths in above-listed wavelength bands or spectra. The substrate 215 may be rigid or flexible. The substrate 215 may have flat surfaces or at least one curved surface. In some embodiments, the birefringent film 205 disposed at (e.g., formed at, attached to, deposited at, bonded to, etc.) the curved surface of the substrate 215 may also have a curved shape. In some embodiments, the substrate 215 may be a part of another optical element, another optical device, or another opto-electrical device. In some embodiments, the substrate 215 may be a part of a functional device, such as a display screen. In some embodiments, the substrate 215 may be a part of an optical waveguide fabricated based on a suitable material, such as glass, plastics, sapphire, or a combination thereof. In some embodiments, the substrate 215 may be a conventional lens, e.g., a glass lens.

In some embodiments, the LC layer 205 may include active LCs. In some embodiments, the alignments layers 210 disposed at the two substate 215 may be configured to provide anti-parallel surface alignments to LCs included in the LC layer 205. The conductive electrode layer 240 may be transmissive at least in the same wavelength band as the substrate 215. Each conductive electrode layer 240 may include a plurality of striped electrodes arranged in parallel, e.g., 240a and 240b.

As shown in FIG. 2A, a power source 152a may be electrically coupled to the striped electrodes 240a of the waveplate segment 105-1, and a power source 152b may be electrically coupled to the striped electrodes 240b of the waveplate segment 105-2. A driving voltage may be applied to the striped electrodes 240a or 240b via the power source 152a or 152b to generate a vertical electric field in the waveplate segment 105-1 or 105-2. The vertical electric field in the LC layer 205 may be substantially perpendicular to the substrates 215. The waveplate segment 105-1 or 105-2 may operate in the switching state when the driving voltage is lower than or equal to a predetermined voltage of the LC layer 205, or operate in the non-switching state when the driving voltage is higher than the predetermined voltage (and sufficiently high) to reorient the LC molecules 212 along the direction of the vertical electric field (e.g., the z-axis direction). The controller 115 may individually or independently control the driving voltage output from the power sources 152a and 152b to control the operation state of the waveplate segments 105-1 and 105-2.

For example, as shown in FIG. 2A, the controller 115 may individually or independently control the driving voltage output from the power sources 152a and 152b to be lower than or equal to the predetermined voltage of the LC layer 205. Thus, both the waveplate segments 105-1 and 105-2 may operate in the switching state. For example, when the input light 102 is a right-handed circularly polarized ("RHCP") light, output lights 108a and 108b output from the waveplate segments 105-1 and 105-2 respectively may be left-handed circularly polarized ("LHCP") lights. An overall output light 108 output from the waveplate segments 105-1 and 105-2 may be an LHCP light.

As shown in FIG. 2B, the controller 115 may control the driving voltage output from the power source 152a to be lower than or equal to the predetermined voltage. Thus, the waveplate segment 105-1 may operate in the switching state, and the output light 108a output from the waveplate segment 105-1 may be an LHCP light. In addition, the controller 115 may control the driving voltage output from the power source 152b to be higher than the predetermined voltage (and sufficiently high). Thus, the waveplate segment 105-2 may operate in the non-switching state, and the output light 108b output from the waveplate segment 105-2 may be an RHCP light. Thus, the overall output light 108 output from the waveplate segments 105-1 and 105-2 may have a first portion (e.g., a left portion) that is left-handed circularly polarized, and a second portion (e.g., a right portion) that is right-handed circularly polarized. Thus, the polarizations of the portions of the overall output light 108 (or the local polarization of the overall output light 108) of the segmented waveplate 105 may be individually or independently controlled by the controller 115.

Figure 3A:
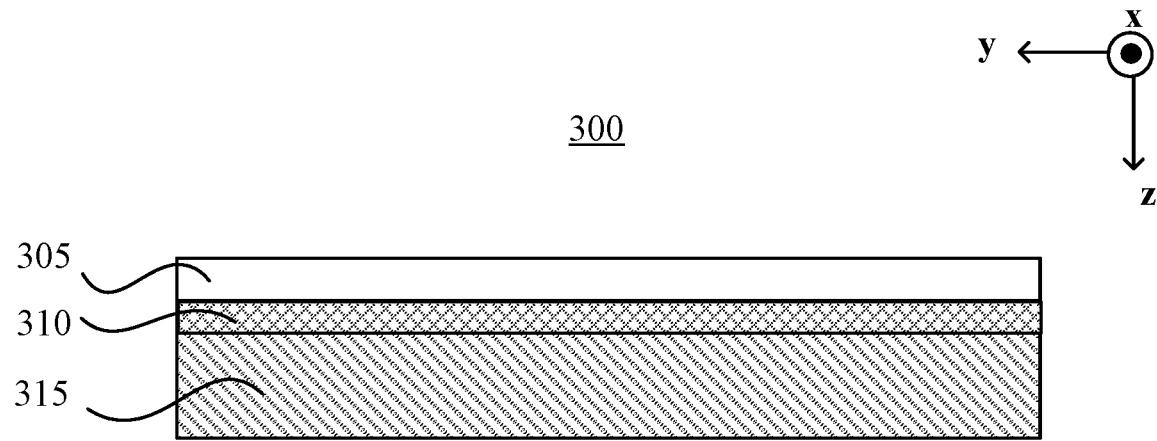
FIGS. 3A-3D schematically illustrate diagrams of polarization selective segments of a polarization selective optical element, according to various embodiments of the present disclosure FIG. 4A schematically illustrates in-plane orientations of optically anisotropic molecules included in a polarization selective segment, according to an embodiment of the present disclosure.
Figure 3B:
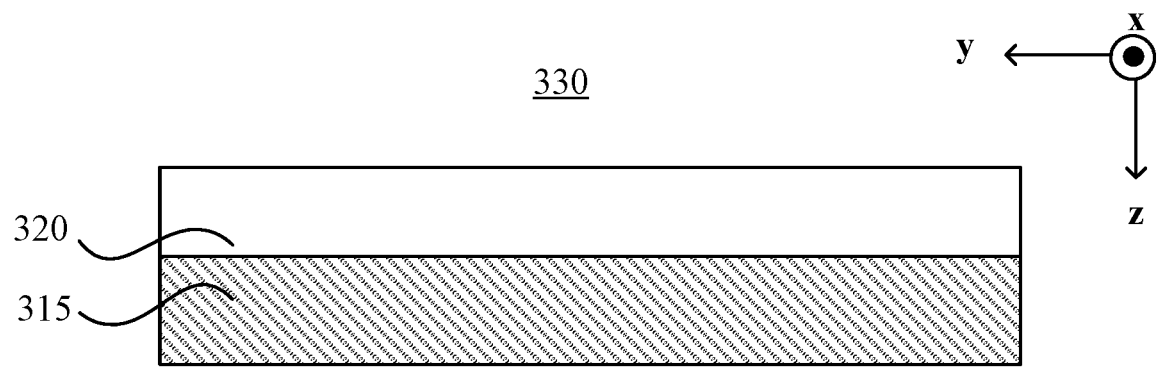

FIGS. 3A and 3B schematically illustrate diagrams of polarization selective segments of the PSOE 110 included in the polarization selective device 100 shown in FIGS. 1A and 1B, according to various embodiments of the present disclosure. The polarization selective segment shown in FIG. 3A, 3B, 3C, or 3D may be an embodiment of the polarization selective segment 110-1, 110-2, 110-3, or 110-4 of the PSOE 110 included in the polarization selective device 100 shown in FIGS. 1A and 1B.

FIG. 3A illustrates a schematic y-z sectional view of a polarization selective segment 300, according to an embodiment of the present disclosure. The polarization selective segment 300 may be a passive polarization selective segment. As shown in FIG. 3A, the polarization selective segment 300 may include a birefringent film 305 and an alignment layer 310 (e.g., a photo-alignment material layer) coupled to the birefringent film 305. The birefringent film 305 may include one or more birefringent materials having an intrinsic birefringence, such as liquid crystals ("LCs") or reactive mesogens ("RMs"). The alignment layer 310 may at least partially align the LCs or RMs in the birefringent film 305 that are in contact with the alignment layer 310, such that the LCs or RMs are aligned in a predetermined in-plane orientation pattern. In some embodiments, RMs may be mixed with photo- or thermo-initiators, such that the aligned RMs may be in-situ photo- or thermo-polymerized/cross-linked to solidify the film and stabilize the alignment pattern of the RMs in the birefringent film 305. In some embodiments, LCs may be mixed with photo- or thermo-initiators and polymerizable monomers, such that the aligned LCs may be in-situ photo- or thermo-polymerized/crosslinked to solidify the film and stabilize the alignment pattern of the LCs in the birefringent film 305.

In some embodiments, the polarization selective segment 300 may include one or more substrates 315 for support and protection purposes. The birefringent film 305 may be disposed at (e.g., formed at, attached to, deposited at, bonded to, etc.) a surface of the substrate 315. For discussion purposes, FIG. 3A shows that the polarization selective segment 300 includes one substrate 315. In some embodiments, the substrate 315 may be a substrate where the recording film is disposed during the recording process of the polarization selective segment 300. The substrate 315 may be similar to the substate 215 of the segmented waveplate 105 shown in FIGS. 2A and 2B. For example, in some embodiments, the substrate 315 may be transparent and/or reflective in one or more predetermined wavelength bands or spectra, e.g., the UV spectrum (or a portion of the UV spectrum), the visible spectrum (or a portion of the visible spectrum), or the IR spectrum (or a portion of the IR spectrum). The substrate 315 may be fabricated based on an organic material and/or an inorganic material that is substantially transparent to the light of above-listed spectrum bands.

The substrate 315 may be rigid or flexible. The substrate 315 may have flat surfaces or at least one curved surface, and the birefringent film 305 disposed at (e.g., formed at, attached to, deposited at, bonded to, etc.) the curved surface may also have a curved shape. In some embodiments, the substrate 315 may also be a part of another optical element, another optical device, or another opto-electrical device. In some embodiments, the substrate 315 may be a part of a functional device, such as a display screen. In some embodiments, the substrate 315 may be a part of an optical waveguide fabricated based on a suitable material, such as glass, plastics, sapphire, or a combination thereof. In some embodiments, the substrate 315 may be a conventional lens, e.g., a glass lens. Although one substrate 315 is shown in FIG. 3A, in some embodiments, the polarization selective segment 300 may include two substrates 315 sandwiching the birefringent film 305. In some embodiments, each substrate 315 may be provided with an alignment layer 310 configured to align the LCs or RMs in the birefringent film 305.

In some embodiments, the substrate 315 and/or the alignment layer 310 may be used to fabricate, store, or transport the polarization selective segment 300. In some embodiments, the substrate 315 and/or the alignment layer 310 may be detachable or removable from other portions of the polarization selective segment 300 after the other portions of the polarization selective segment 300 are fabricated or transported to another place or device. That is, the substrate 315 and/or the alignment layer 310 may be used in fabrication, transportation, and/or storage to support the alignment layer 310 and the birefringent film 305 provided on the substrate 315 and/or the alignment layer 310, and may be separated or removed from the birefringent film 305 when the fabrication of the polarization selective segment 300 is completed, or when the polarization selective segment 300 is to be implemented in an optical device.

FIG. 3B illustrates a schematic y-z sectional view of a polarization selective segment 330 according to an embodiment of the present disclosure. The polarization selective segment 330 shown in FIG. 3B may include elements that are the same as or similar to those included in the polarization selective segment 300 shown in FIG. 3A. The polarization selective segment 330 may be a passive polarization selective segment. As shown in FIG. 3B, the polarization selective segment 330 may include a birefringent film 320. The birefringent film 320 may include one or more materials configured to generate a photo-induced birefringence, such as amorphous or liquid crystal polymers with polarization sensitive photo-reactive groups. The birefringent film 320 may be relatively thicker than the birefringent film 305 shown in FIG. 3A. A predetermined 3D orientation pattern of the optic axis of the birefringent film 320 may be directly recorded in the birefringent film 320 via bulk-mediated photo-alignment during a recording process. In some embodiments, the polarization selective segment 330 may also include one or more substrates 315 for support and protection purposes. Detailed descriptions of the substrate 315 may refer to the above descriptions rendered in connection with FIG. 3A. Although one substrate 315 is shown in FIG. 3B, in some embodiments, the polarization selective segment 330 may include two substrate 315 sandwiching the birefringent film 320.

Figure 3C:

FIG. 3C illustrates a schematic y-z sectional view of a polarization selective segment 350 according to an embodiment of the present disclosure. The polarization selective segment 350 may include elements that are the same as or similar to those included in the polarization selective segment 300 shown in FIG. 3A or the polarization selective segment 330 shown in FIG. 3B. Detailed descriptions of the same or similar elements may refer to the above descriptions rendered in connection with FIG. 3A or FIG. 3B. The polarization selective segment 350 may be an active polarization selective segment. The birefringent film 305 may be disposed (e.g., sandwiched) between two substrates 315. In some embodiments, each substrate 315 may be provided with an alignment layer 310 and a conductive electrode 340 that is disposed between the alignment layer 310 and the substrate 315. In the embodiment shown in FIG. 3C, the electrodes 340 are disposed at two opposite sides of the birefringent film 305. The electrode 340 may be transmissive and/or reflective at least in the same wavelength band as the substrate 315. The electrode 340 may be a continuous planar electrode or a pattern electrode. FIG. 3C shows the electrode 340 as a continuous planar electrode for illustrative purposes. A driving voltage generated by a power source may be applied to the electrodes 340 disposed at two opposite substrates 315 to generate a vertical electric field perpendicular to the substrates 315 in the birefringent film 305.

In some embodiments, the birefringent film 305 may include active LCs. The electric field may re-orient optically anisotropic molecules (e.g., LC molecules) in the birefringent film 305, thereby switching the optical properties of the polarization selective segment 350. The vertical electric field may realize an out-of-plane reorientation of the LC molecules in the birefringent film 305. The term "out-of-plane reorientation" refers to rotation (or reorientation) of the directors of the LC molecules in a direction non-parallel with (hence out of) a surface plane of the birefringent film 305. Although not shown in FIG. 3C, in some embodiments, one of the two substrates 315 may be provided with the alignment layer 310, and the other one of the two substrates 315 may not be provided with an alignment layer.

Figure 3D:
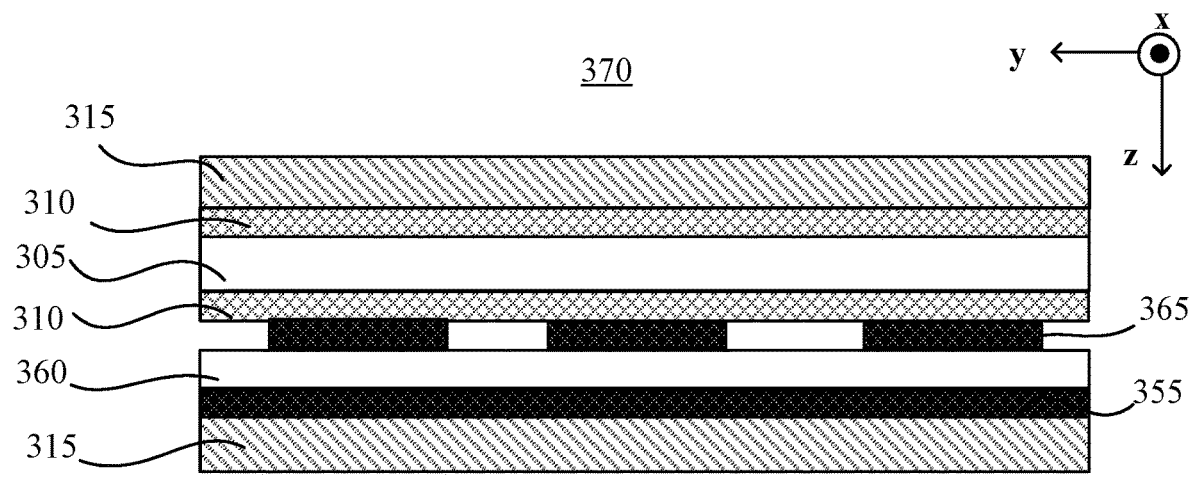

FIG. 3D illustrates a schematic y-z sectional view of a polarization selective segment 370 according to an embodiment of the present disclosure. The polarization selective segment 370 may include elements that are the same as or similar to those included in the polarization selective segment 300 shown in FIG. 3A, the polarization selective segment 330 shown in FIG. 3B, or the polarization selective segment 350 shown in FIG. 3C. Detailed descriptions of the same or similar elements may refer to the above descriptions rendered in connection with FIG. 3A, FIG. 3B, or FIG. 3C. The polarization selective segment 370 may be an active polarization selective segment.

As shown in FIG. 3D, the birefringent film 305 may be disposed (e.g., sandwiched) between two substrates 315. At least one (e.g., each) of the substrates 315 may be provided with the alignment layer 310. In some embodiments, each of the alignment layers 310 disposed at the two substate 315 may be configured to provide a planar alignment (or an alignment with a small pretilt angle) to the anisotropic molecules (e.g., LC molecules). In some embodiments, the alignments layers 310 disposed at the two substate 315 may be configured to provide parallel surface alignments or anti-parallel surface alignments. In some embodiments, the alignment layers 310 disposed at the two substates 315 may be configured to provide hybrid surface alignments. For example, the alignment layer 310 disposed at one of two the substates 315 may be configured to provide a planar alignment (or an alignment with a small pretilt angle), and the alignment layer 310 disposed at the other one of the two substates 315 may be configured to provide a homeotropic alignment.

In some embodiments, an upper electrode 365 and a lower electrode 355 may be disposed at the same substate 315 (e.g., a bottom substate 315 shown in FIG. 3D). That is, the electrodes 355 and 365 may be provided at the same side of the birefringent film 305. In some embodiments, the lower electrode 355 may be disposed on a surface of the bottom substrate 315. An electrically insulating layer 360 may be disposed between the upper electrode 365 and the lower electrode 355. The alignment layer 310 provided at the bottom substrate 315 may be disposed between the upper electrode 365 and the birefringent film 305. In some embodiments, the lower electrode 355 may include a planar electrode and the upper electrode 365 may include a patterned electrode (e.g., a plurality of striped electrodes arranged in parallel).

A voltage may be applied to the upper electrode 365 and the lower electrode 355 to generate a horizontal electric field in the birefringent film 305 to reorient the anisotropic molecules (e.g., LC molecules), thereby switching the optical properties of the polarization selective segment 370. The horizontal electric field may realize an in-plane reorientation of the LC molecules in the birefringent film 305. In some embodiments, other configurations of the electrodes for generating a horizontal electric field in the birefringent film 305 may be used. For example, another configuration of the electrodes may include interdigital electrodes (e.g. in-plane switching electrodes) disposed at the same substate (or at the same side of the birefringent film 305) for an in-plane switching of the LC molecules. Although not shown, in some embodiments, one of the substrates 315 may be provided with the alignment layer 310, and the other one of the substrates 315 may not be provided with the alignment layer 310.

The birefringent film in a polarization-selective segment disclosed herein may include a birefringent material. Calamitic (rod-like) LC molecules are examples of optically anisotropic molecules that may be included in the birefringent film. The rod-like LC molecule may have a longitudinal direction (or a length direction) and a lateral direction (or a width direction). The longitudinal direction of the LC molecule may be referred to as a director of the LC molecule or an LC director. An orientation of the LC director may determine a local optic axis orientation or an orientation of the optic axis at a local point of the birefringent film. The term "optic axis" may refer to a direction in a crystal. A light propagating in the optic axis direction may not experience birefringence (or double refraction). An optic axis may be a direction rather than a single line: lights that are parallel to that direction may experience no birefringence. The local optic axis may refer to an optic axis within a predetermined region of a crystal.

Figure 4A:
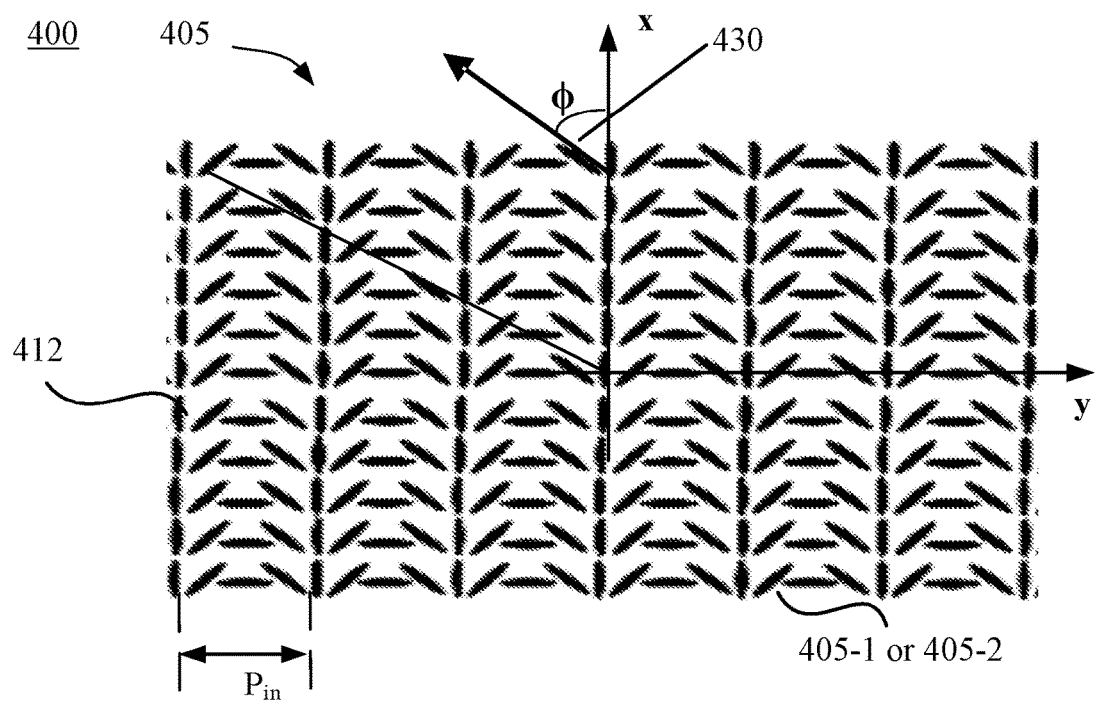
FIG. 4B schematically illustrates out-of-plane orientations of optically anisotropic molecules included in the polarization selective segment shown in FIG. 4A, according to an embodiment of the present disclosure.
FIGS. 4C and 4D schematically illustrate polarization selective diffractions of the polarization selective segment shown in FIGS. 4A and 4B, according to an embodiment of the present disclosure.
Figure 4B:
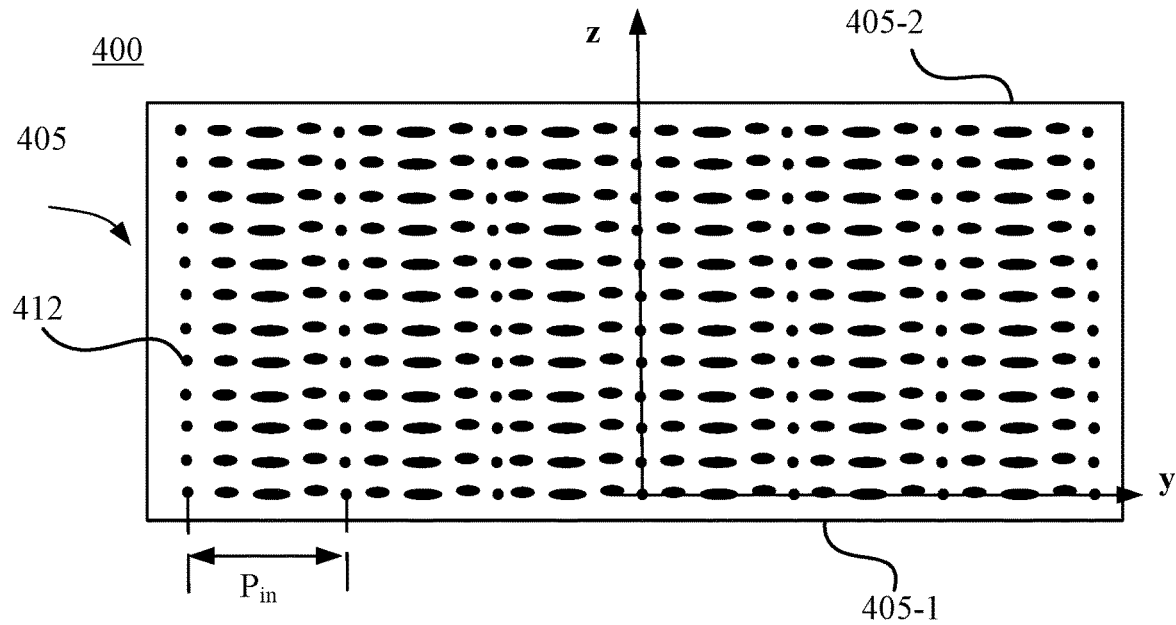

FIG. 4A schematically illustrates an x-y sectional view of an in-plane orientation pattern of LC molecules in a birefringent film 405 of a polarization selective segment 400, according to an embodiment of the present disclosure. FIG. 4B schematically illustrates a y-z sectional view of an out-of-plane orientation pattern of the LC molecules in the birefringent film 405 of the polarization selective segment 400, according to an embodiment of the present disclosure. The polarization selective segment 400 may include elements that are the same as or similar to those included in the polarization selective segment 300, 330, 350, or 370 shown in FIG. 3A, 3B, 3C, or 3D. Detailed descriptions of the same or similar elements may refer to the above descriptions rendered in connection with FIG. 3A, 3B, 3C, or 3D. The polarization selective segment 400 may be an embodiment of the polarization selective segment 300, 330, 350, 370, 110-1, 110-2, 110-3, or 110-4. The birefringent film 405 may be similar to the birefringent film 305 shown in FIG. 3A, 3B, 3C, or 3D. The birefringent film 405 may include a first surface 405-1 and a second surface 405-2 opposite to the first surface 405-1. In a region substantially close to (including at) a surface (e.g., at least one of the first surface 405-1 or the second surface 405-2) of the birefringent film 405, the optic axis of the birefringent film 405 may rotate continuously and periodically in a predetermined in-plane direction (e.g., a y-axis direction) with a uniform (or same) in-plane pitch $P_{in}$. The polarization selective segment 400 may function as a polarization selective grating (also referred to as 400 for discussion purposes).

As shown in FIG. 4A, in a region substantially close to (including at) a surface of the birefringent film 405, the LC molecules 412 may have a periodic in-plane orientation pattern with a uniform (e.g., same) in-plane pitch Pm in a predetermined in-plane direction (e.g., a y-axis direction). For example, LC directors of LC molecules 412 located in close proximity to or at a surface of the birefringent film 405 may be configured to periodically and continuously rotate in the predetermined in-plane direction along the surface (or in a plane parallel with the surface). In other words, azimuthal angels 430 (represented by ϕ) of the LC molecules 412 located in close proximity to or at the surface of the birefringent film 405 may be configured to periodically and continuously change in the predetermined in-plane direction along the surface. In addition, at the surface of the birefringent film 405, the directors of the LC molecules 412 may rotate in a predetermined rotation direction, e.g., a clockwise direction or a counter-clockwise direction. Accordingly, the rotation of the directors of the LC molecules 412 at the surface of the birefringent film 405 may exhibit a handedness, e.g., right handedness or left handedness.

The predetermined in-plane direction may be any suitable in-plane direction along the surface (or in a plane parallel with the surface) of the birefringent film 405. For illustrative purposes, FIG. 4A shows that the predetermined in-plane direction is a y-axis direction. The in-plane pitch $P_{in}$ is defined as a distance along the in-plane direction (e.g., the y-axis direction) over which the LC directors rotate by a predetermined value (e.g., 180°) from a predetermined initial state (or reference state). In some embodiments, the periodic in-plane orientation pattern with the uniform (or same) in-plane pitch $P_{in}$ may correspond to a grating pattern. The in-plane pitch $P_{in}$ may determine, in part, the optical properties of the polarization selective grating 400. The in-plane pitch $P_{in}$ may determine the diffraction angles of lights diffracted by the polarization selective grating 400 in different diffraction orders. In some embodiments, the diffraction angle for a light having a fixed wavelength may increase as the in-plane pitch $P_{in}$ decreases.

FIG. 4B schematically illustrates a y-z sectional view of a portion of out-of-plane orientations of the directors of the LC molecules 412 in the birefringent film 405 of the polarization selective segment 400 shown in FIG. 4A, according to an embodiment of the present disclosure. As shown in FIG. 4B, within a volume of the birefringent film 405, along the thickness direction (e.g., the z-axis direction) of the birefringent film 405, the directors (or the azimuth angles ϕ) of the LC molecules 412 may have a substantially same orientation (or value) from the first surface 405-1 to the second surface 405-2 of the birefringent film 405. In some embodiments, the thickness of the birefringent film 405 may be configured as $d=\lambda/(2*\Delta n)$, where ζ is a design wavelength, Δn is the birefringence of the LC material of the birefringent film 405, and $\Delta n = n_e - n_o$, $n_e$ and $n_o$ are the extraordinary and ordinary refractive indices of the LC material, respectively.

In some embodiments, the polarization selective segment 400 including the birefringent film 405 having the LC molecules 412 configured with the in-plane orientations shown in FIG. 4A and out-of-plane orientations shown in FIG. 4B may function as a PBP grating, which may modulate a circularly polarized light based on a phase profile provided through a geometric phase. When the thickness of the birefringent film 405 corresponds to a half-wave plate phase difference between an ordinary light and an extraordinary light, the geometric phase between two points across a light beam profile may be equal to two times of the relative rotation of the optic axis at the two points. In some embodiments, a twist structure may be introduced along the thickness direction of the birefringent film 405 and may be compensated for by its mirror twist structure, which may enable the PBP grating to have an achromatic performance.

Figure 4C:
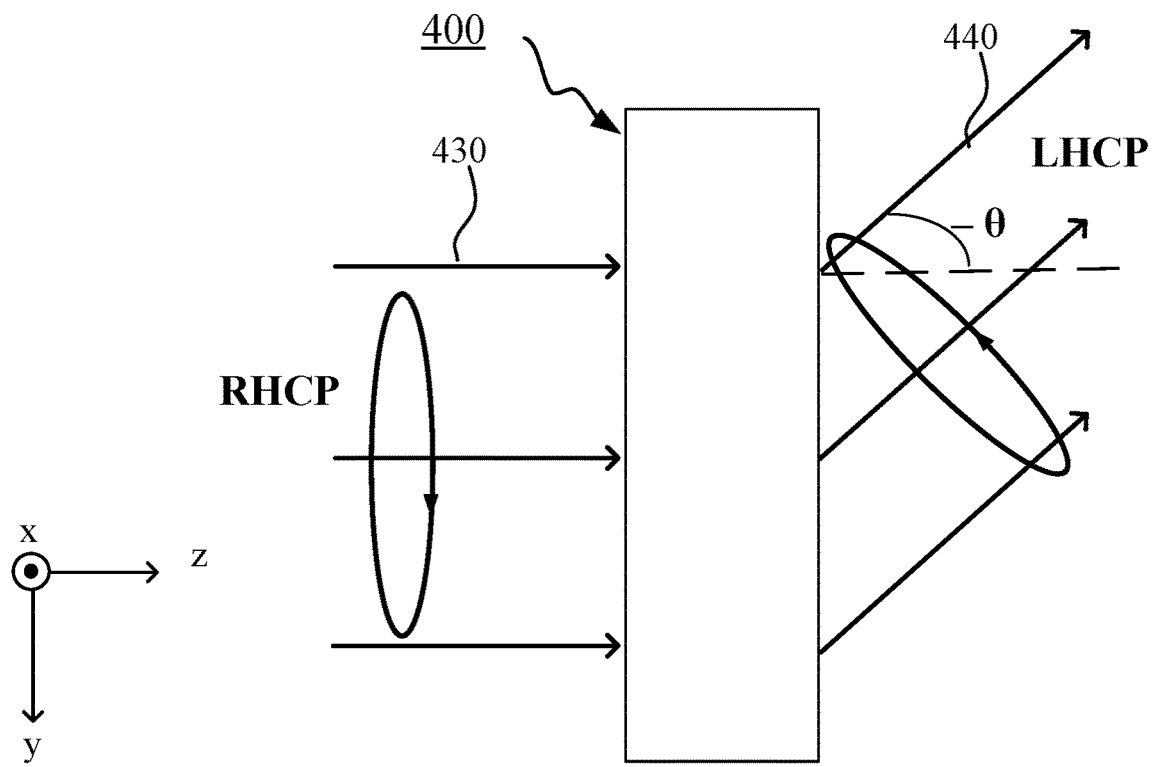
Figure 4D:
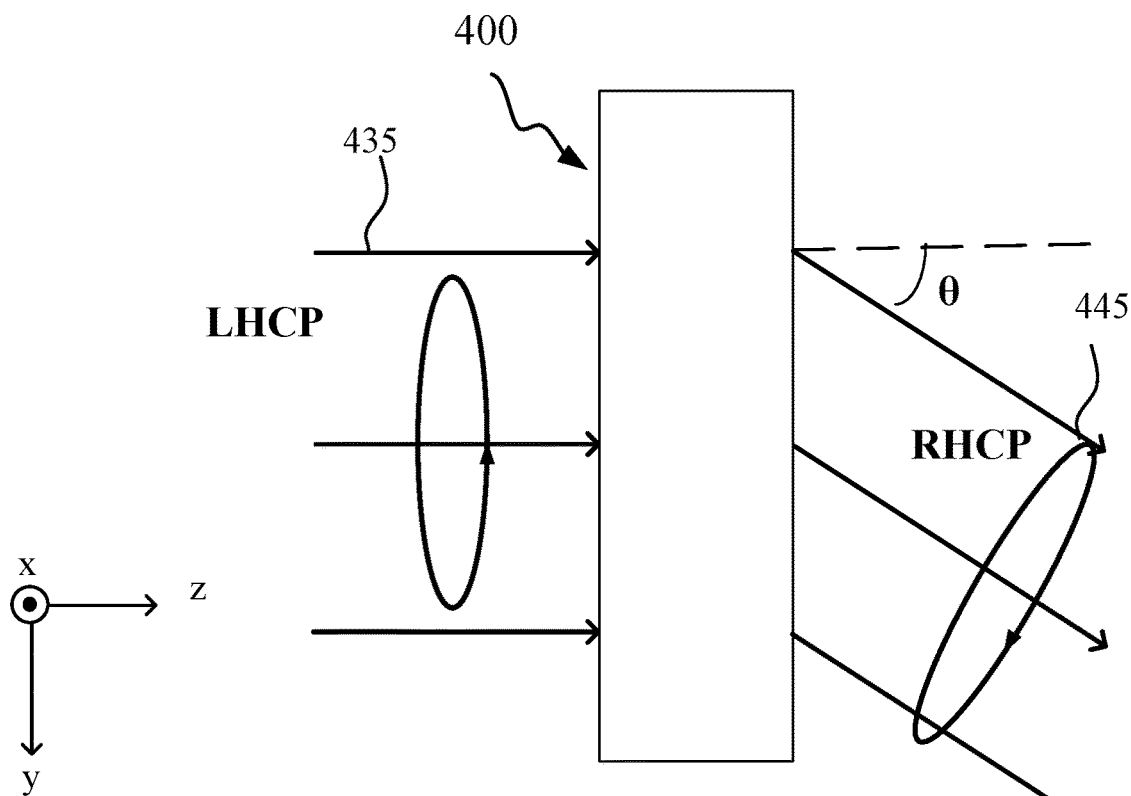

FIGS. 4C and 4D illustrate polarization selective diffractions of the polarization selective segment 400 functioning as a PBP grating 400, according to an embodiment of the present disclosure. The PBP grating 400 may be a passive PBP grating or an active PBP grating. A passive PBP grating may have or may be configurable to operate in two optical states, a positive state and a negative state. Referring to FIGS. 4C and 4D, the optical state of the passive PBP grating may depend on the handedness of a circularly polarized input light and the handedness of the rotation of the directors of the LC molecules 412 at the surface (e.g., at least one of the first surface 405-1 or the second surface 405-2) of the birefringent film 405. For example, as shown in FIG. 4A, the passive PBP grating 400 may operate in a positive state in response to a right-handed circularly polarized ("RHCP") light 430 (having a wavelength in a predetermined wavelength range and an incidence angle in a predetermined incidence angle range). The passive PBP grating 400 may forwardly diffract the RHCP light 430 to a negative angle (e.g., −θ).

As shown in FIG. 4B, the passive PBP grating 400 may operate in a negative state in response to a left-handed circularly polarized ("LHCP") light 435 (having a wavelength in a predetermined wavelength range and an incidence angle in a predetermined incidence angle range). The passive PBP grating 400 may forwardly diffract the LHCP light 435 to a positive angle (e.g., +θ). In addition, the passive PBP grating 400 may reverse the handedness of a circularly polarized light transmitted therethrough in addition to diffracting the light. For example, as shown in FIG. 4A, the passive PBP grating 400 may forwardly diffract the RHCP light 430 as an LHCP light 440. As shown in FIG. 4B, the passive PBP grating 400 may forwardly diffract the LHCP light 435 as an RHCP light 445. In some embodiments, the passive PBP grating 400 may operate in a positive state in response to an LHCP light, and operate in a negative state in response to an RHCP light. The passive PBP grating 400 may be indirectly switchable between the positive state and the negative state when a handedness of an input light is changed through an external polarization switch (e.g., an SHWP) disposed at a light incidence side of the passive PBP grating 400. For an unpolarized input light having a wavelength in a predetermined wavelength range and an incidence angle in a predetermined incidence range, the passive PBP grating 400 may diffract an RHCP component and an LHCP component of the unpolarized input light to a negative angle (e.g., $-\theta$) and a positive angle (e.g., $+\theta$), respectively. Thus, the passive PBP grating 400 may function as a circular polarization beam splitter.

An active PBP grating may have or may be configurable to operate in three optical states, i.e., a positive state, a neutral state, and a negative state. The optical state of the active PBP grating may depend on the handedness of a circularly polarized input light, the handedness of the rotation of the directors of the LC molecules 412 at the surface of the birefringent film 405, and a voltage applied to the active PBP grating. For example, as shown in FIG. 4A, when the PBP grating 400 is an active PBP grating, and when a voltage applied to the active PBP grating via a power source controlled by a controller (not shown in FIG. 4A) is lower than a predetermined threshold voltage, the active PBP grating 400 may operate in a positive state in response to an RHCP light 430 having a wavelength in a predetermined wavelength range and an incidence angle in a predetermined incidence range. The active PBP grating 400 may forwardly diffract the RHCP light 430 to a negative angle (e.g., $-\theta$). As shown in FIG. 4B, when a voltage applied to the active PBP grating 400 is lower than a predetermined threshold voltage, the active PBP grating 400 may operate in a positive state in response to an LHCP light 435 having a wavelength in a predetermined wavelength range and an incidence angle in a predetermined incidence angle range. The active PBP grating 400 may forwardly diffract the LHCP light 435 to a positive angle (e.g., $+\theta$). In addition, similar to the passive PBP grating, the active PBP grating operating in the positive state or the negative state may reverse the handedness of a circularly polarized light transmitted therethrough in addition to diffracting the light.

The active PBP grating 400 may operate in a neutral state when the voltage applied to the active PBP grating 400 is sufficiently high to reorient the LC molecules along the direction of a generated electric field. The active PBP grating 400 operating in a neutral state may not diffract a circularly polarized light, and may or may not affect the polarization of the circularly polarized light transmitted therethrough. For example, in some embodiments, the electric field generated in the birefringent film 405 may be a vertical electric field, and the active PBP operating 400 in a neutral state may not affect the polarization of a circularly polarized light transmitted therethrough. In some embodiments, the electric field generated in the birefringent film 405 may be a horizontal electric field, and the active PBP operating 400 in a neutral state may reserve the handedness of a circularly polarized light transmitted therethrough. In some embodiments, the active PBP grating 400 may be directly switchable between a positive state (or negative state) and a neutral state through varying an applied voltage. In some embodiments, the active PBP grating 400 may be indirectly switchable between a positive state and a negative state when a handedness of an input light is changed through an external polarization switch (e.g., an SHWP).

Figure 5A:
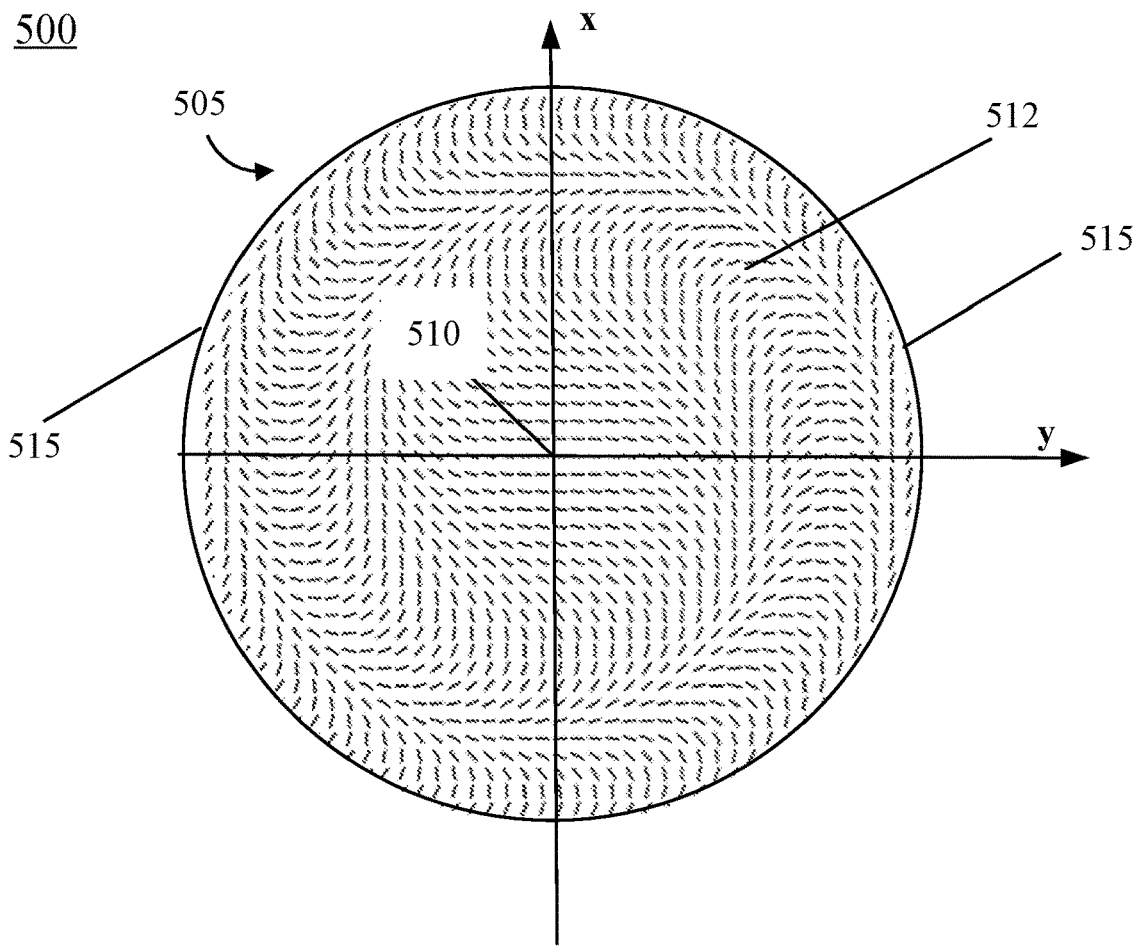
FIGS. 5A and 5B schematically illustrate in-plane orientations of optically anisotropic molecules included in a polarization selective segment, according to another embodiment of the present disclosure.
Figure 5B:
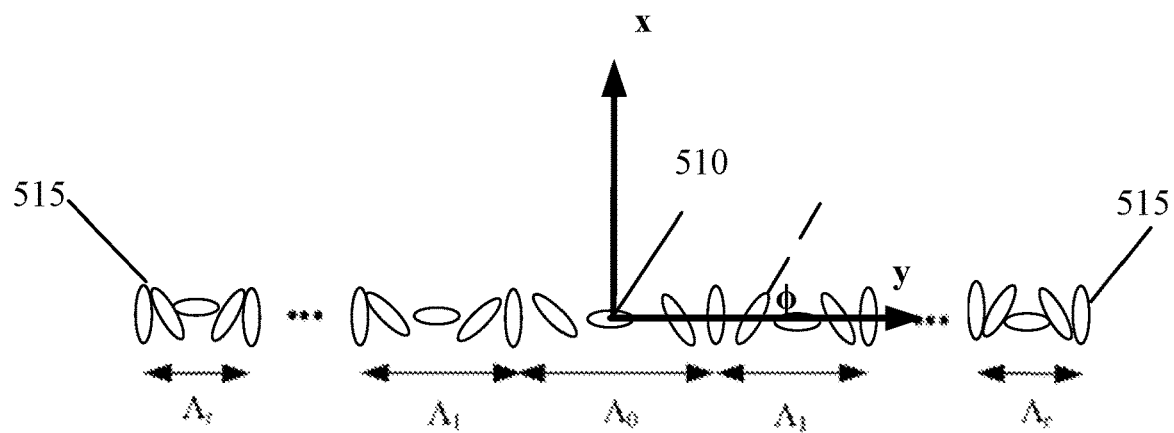

FIG. 5A schematically illustrates an x-y sectional view of an in-plane orientation pattern of LC molecules in a birefringent film 505 of a polarization selective segment 500, according to an embodiment of the present disclosure. FIG. 5B illustrates a section of the in-plane orientation pattern taken along a y-axis in the birefringent film 505 of the polarization selective segment 500 shown in FIG. 5A, according to an embodiment of the present disclosure. The polarization selective segment 500 may include elements that are the same as or similar to those included in the polarization selective segment 300, 330, 350, 370, or 400 shown in FIG. 3A, 3B, 3C, 3D, or 4A-4D. Detailed descriptions of the same or similar elements may refer to the above descriptions rendered in connection with FIG. 3A, 3B, 3C, 3D, or 4A-4D. The birefringent film 505 may be similar to the birefringent film 305 shown in FIG. 3A, 3B, 3C, or 3D, or the birefringent film 400 shown in FIGS. 4A and 4B. The birefringent film 505 may include a first surface and a second surface opposite to the first surface. In a region substantially close to (including at) a surface (e.g., at least one of the first surface or the second surface) of the birefringent film 505, the optic axis of the birefringent film 505 may continuously rotate in at least two opposite in-plane directions from a lens center to opposite lens peripheries with a varying pitch. In some embodiments the polarization selective segment 500 may function as a polarization selective lens, e.g., a PBP lens (also referred to as 500 for discussion purposes).

As shown in FIG. 5A, the LC molecules 512 located in close proximity to or at a surface (e.g., at least one of the first surface or the second surface) of the birefringent film 505 may be configured with an in-plane orientation pattern having a varying pitch in at least two opposite in-plane directions from a lens center 510 to opposite lens peripheries 515. For example, LC directors of LC molecules 512 located in close proximity to or at the surface of the birefringent film 505 may continuously rotate in at least two opposite in-plane directions from the lens center 510 to the opposite lens peripheries 515 with a varying pitch. The LC directors may rotate in a same rotation direction (e.g., clockwise, or counter-clockwise) from the lens center 510 to the opposite lens peripheries 515.

A pitch $\Lambda$ of the in-plane orientation pattern may be defined as a distance in the in-plane direction (e.g., a radial direction) over which the orientation of the LC director (or an azimuthal angle $\varphi$ of the LC molecule 512) changes by a predetermined angle (e.g., 180°) from a predetermined initial state. As shown in FIG. 5B, according to the LC director field along the y-axis direction, the pitch $\Lambda$ may be a function of the distance from the lens center 510. The pitch $\Lambda$ may monotonically decrease from the lens center 510 to the lens peripheries 515 in the at least two opposite in-plane directions (e.g., two opposite radial directions) in the x-y plane, e.g., $\Lambda_0 > \Lambda_1 > \ldots > \Lambda_r$. $\Lambda_0$ is the pitch at a central region of the PBP lens 500, which may be the largest. The pitch $\Lambda_r$ is the pitch at an edge region (e.g., periphery 515) of the PBP lens 500, which may be the smallest. In some embodiments, the azimuthal angle $\varphi$ of the LC molecule 512 may change in proportional to the distance from the lens center 510 to a local point of the birefringent film 505 at which the LC molecule 512 is located. For example, the azimuthal angle ϕ of the LC molecule 512 may change according to an equation of $$\phi = \frac{\pi r^2}{2f\lambda},$$

where ϕ is the azimuthal angle of the LC molecule 512 at a local point of the birefringent film 505, r is a distance from the lens center 510 to the local point in the lens plane, f is a focal distance of the PBP lens 500, and λ is a designed operation wavelength of the PBP lens 500.

Figure 5D:
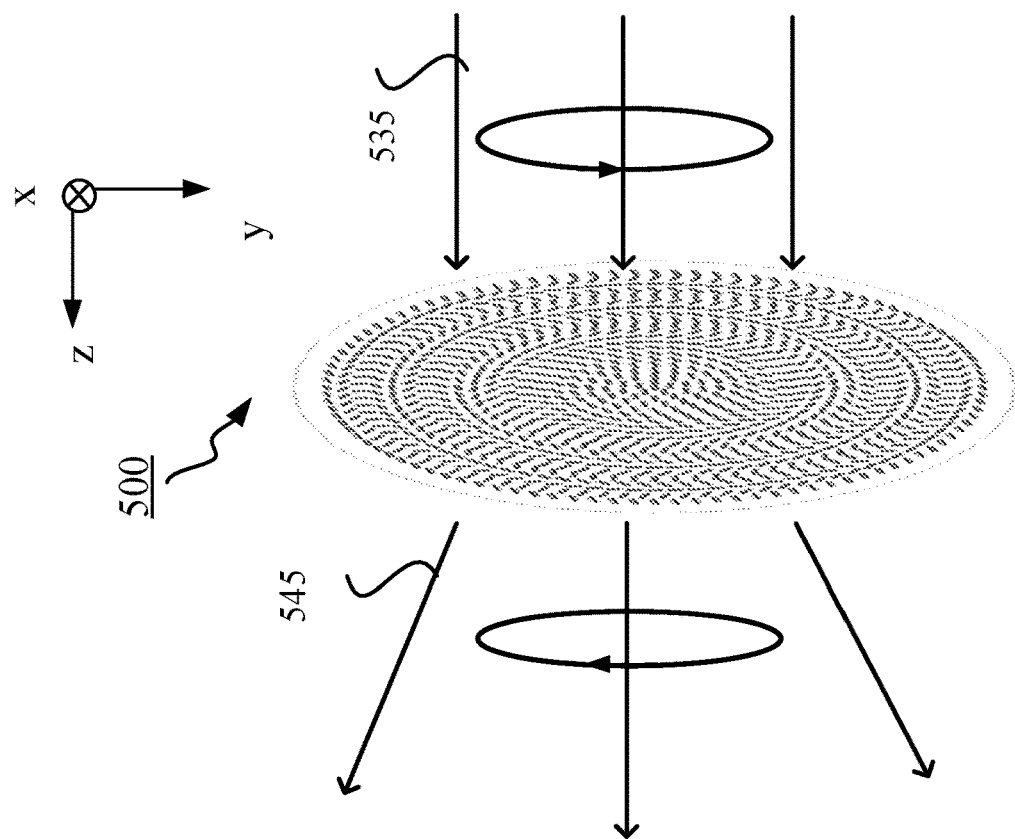
FIGS. 5C and 5D schematically illustrate polarization selective focusing/defocusing of the polarization selective segment shown in FIGS. 5A and 5B, according to an embodiment of the present disclosure.
Figure 5C:
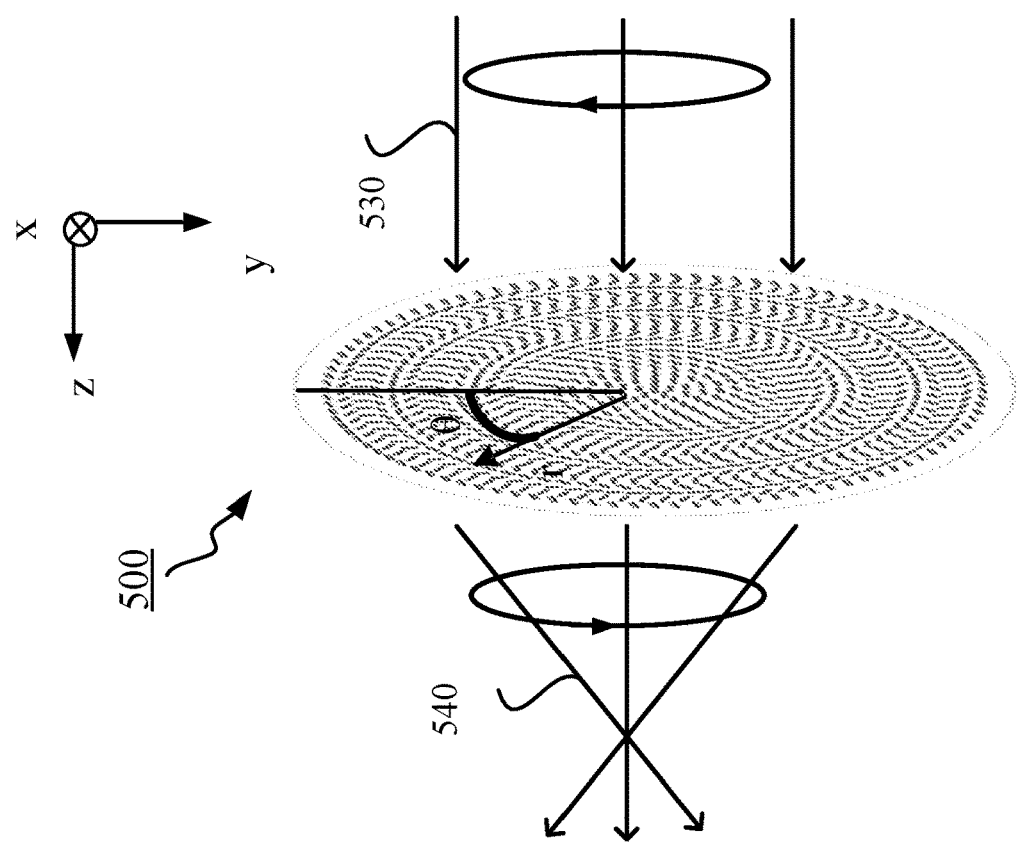

FIGS. 5C and 5D illustrate polarization selective focusing/defocusing of the PBP lens 500, according to an embodiment of the present disclosure. The PBP lens 500 may be a passive PBP lens or an active PBP lens. A passive PBP lens may have, or may be configurable to operate in, two optical states, i.e., a focusing (or converging) state and a defocusing (or diverging) state. The optical state of the passive PBP lens may depend on the handedness of a circularly polarized input light and the rotation direction of the LC directors in the at least two opposite in-plane directions from the lens center 510 to the opposite lens peripheries 515. For example, as shown in FIG. 5C, the passive PBP lens 500 may operate in the focusing state (or the converging state) for an RHCP light 530 having a wavelength in a predetermined wavelength range and an incidence angle in a predetermined incidence range. As shown in FIG. 5D, the passive PBP lens 500 may operate in the defocusing state (or the diverging state) for an LHCP light 535 having a wavelength in a predetermined wavelength range and an incidence angle in a predetermined incidence range. In addition, the passive PBP lens 500 may reverse the handedness of a circularly polarized light transmitted therethrough in addition to focusing/defocusing the light. For example, as shown in FIG. 5C, the passive PBP lens 500 may focus the on-axis collimated RHCP light 530 as an LHCP light 540. As shown in FIG. 5D, the passive PBP lens 500 may defocus the on-axis collimated LHCP light 535 as an RHCP light 545. The passive PBP lens 500 may be indirectly switchable between the positive state and the negative state when a handedness of an input light is changed through an external polarization switch (e.g., an SHWP).

An active PBP lens may have, or may be configurable to operate in, three optical states, i.e., a positive state, a neutral state, and a negative state. The active PBP lens may include electrodes electrically coupled with a power source. The power source may be controlled by a controller. The optical state of the active PBP lens may depend on the handedness of a circularly polarized input light, the rotation direction of the LC directors in the at least two opposite in-plane directions from the lens center 510 to the opposite lens peripheries 515, and a voltage applied to the active PBP lens. For example, when a voltage applied to the active PBP lens is lower than a predetermined threshold voltage, the active PBP lens may operate in the focusing state (or the converging state) for the RHCP light 530 (as shown in FIG. 5C) and operate in the defocusing state (or the diverging state) for the LHCP light 535 (as shown in FIG. 5D). In addition, similar to the passive PBP lens, the active PBP lens operating in the focusing state or the defocusing state may reverse the handedness of a circularly polarized light transmitted therethrough in addition to diffracting the light.

The active PBP lens may operate in a neutral state when the voltage applied to the active PBP lens is sufficiently high to re-orient the LC molecules along the direction of a generated electric field. The active PBP lens operating in a neutral state may not focus or defocus a circularly polarized light, and may or may not affect the polarization of a circularly polarized light transmitted therethrough. For example, in some embodiments, when the electric field generated in the birefringent film 505 is a vertical electric field that is sufficiently high, the active PBP lens may operate in the neutral state and may negligibly affect or may not affect the propagation direction, the wavefront, and the handedness of the circularly polarized incident light. In some embodiments, when the electric field generated in the birefringent film 505 is a horizontal electric field that is sufficiently high, the active PBP lens may operate in the neutral state and may negligibly affect or not affect the propagation direction and the wavefront of the circularly polarized incident light, and may reverse the handedness of the circularly polarized incident light. The active PBP lens may be indirectly switchable between a focusing state and a defocusing state when a handedness of an input light is changed through an external polarization switch (e.g., an SHWP). In addition, the active PBP lens may be directly switchable between a focusing state (or defocusing state) and a neutral state when an applied voltage is varied.

Figure 6A:
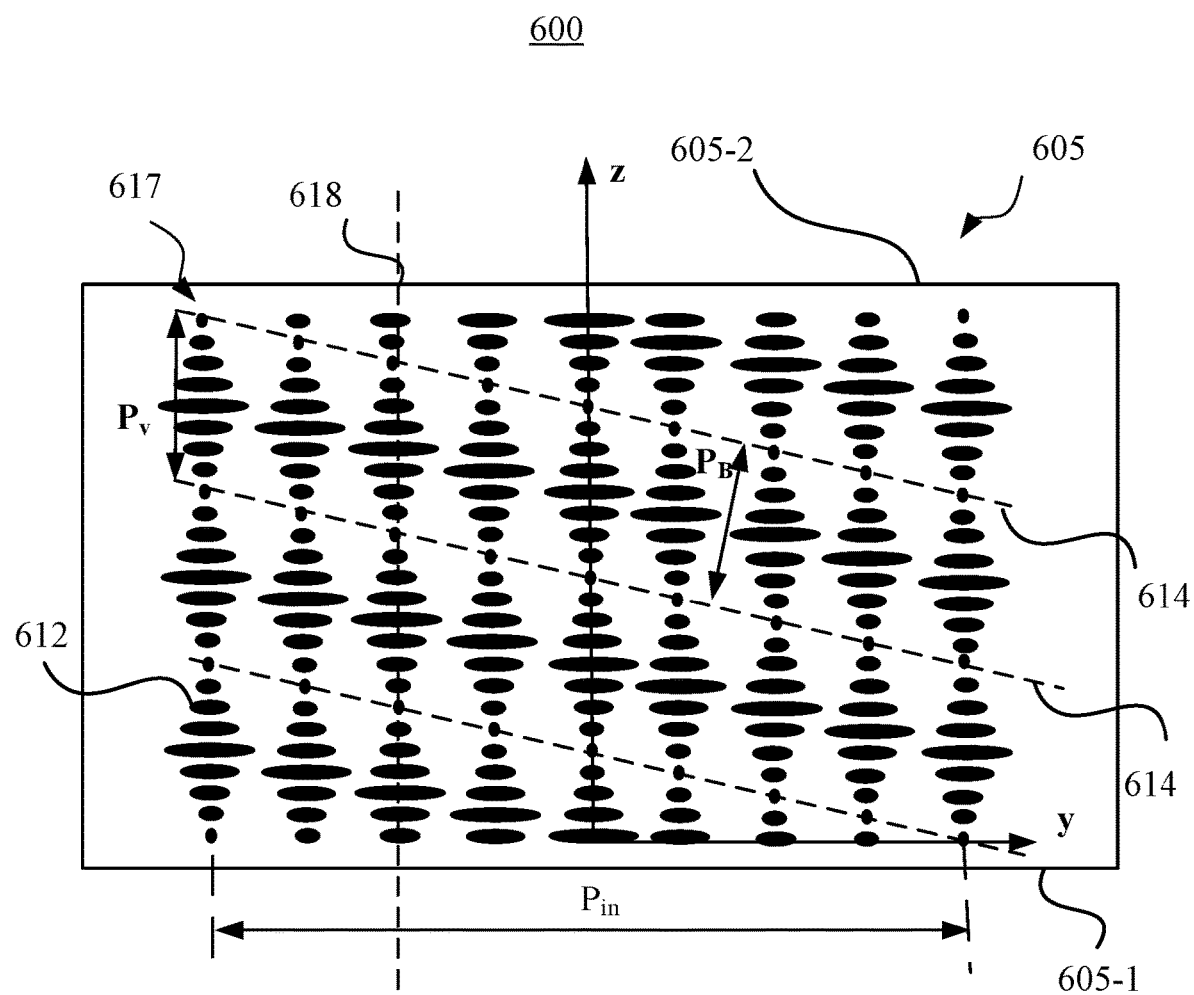
FIG. 6A schematically illustrates out-of-plane orientations of optically anisotropic molecules included in a polarization selective segment, according to another embodiment of the present disclosure.
Figure 6B:
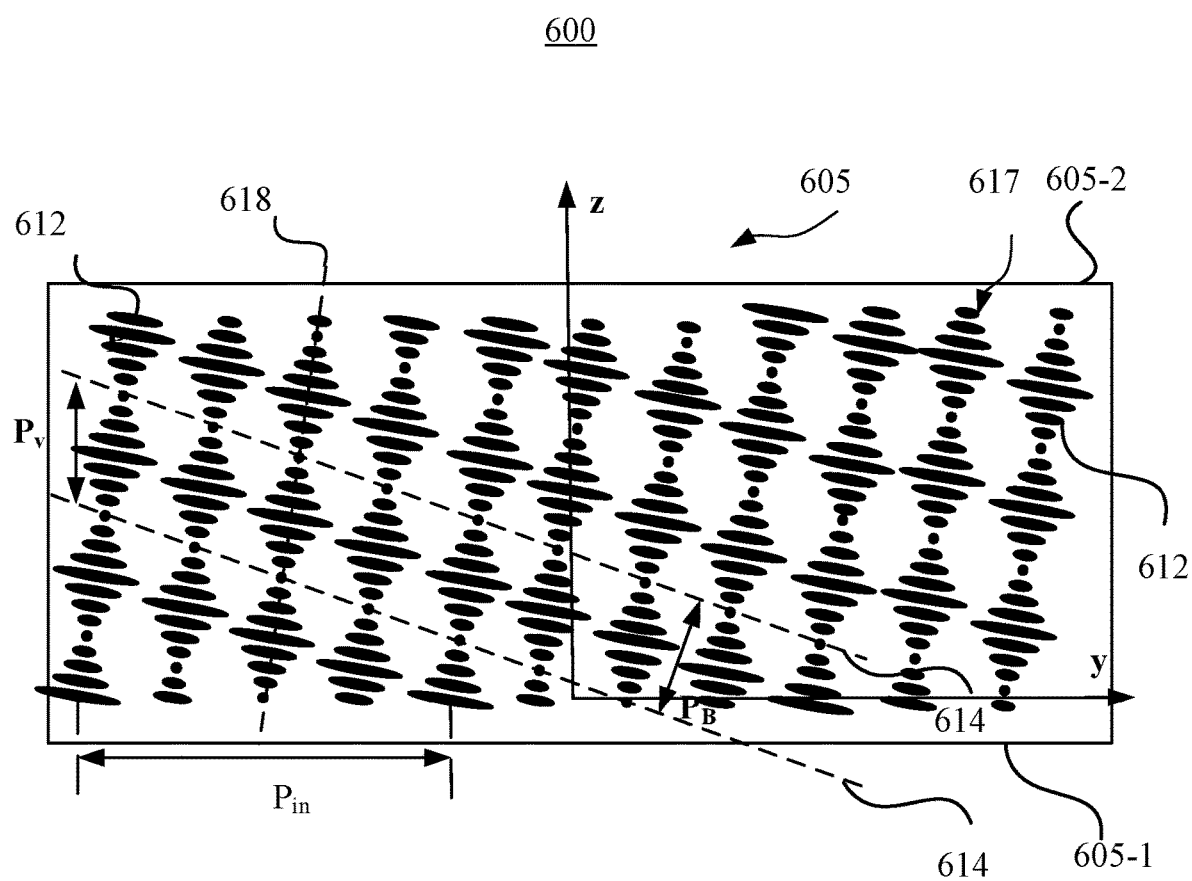
FIG. 6B schematically illustrates out-of-plane orientations of optically anisotropic molecules included in a polarization selective segment, according to another embodiment of the present disclosure.
Figure 6C:
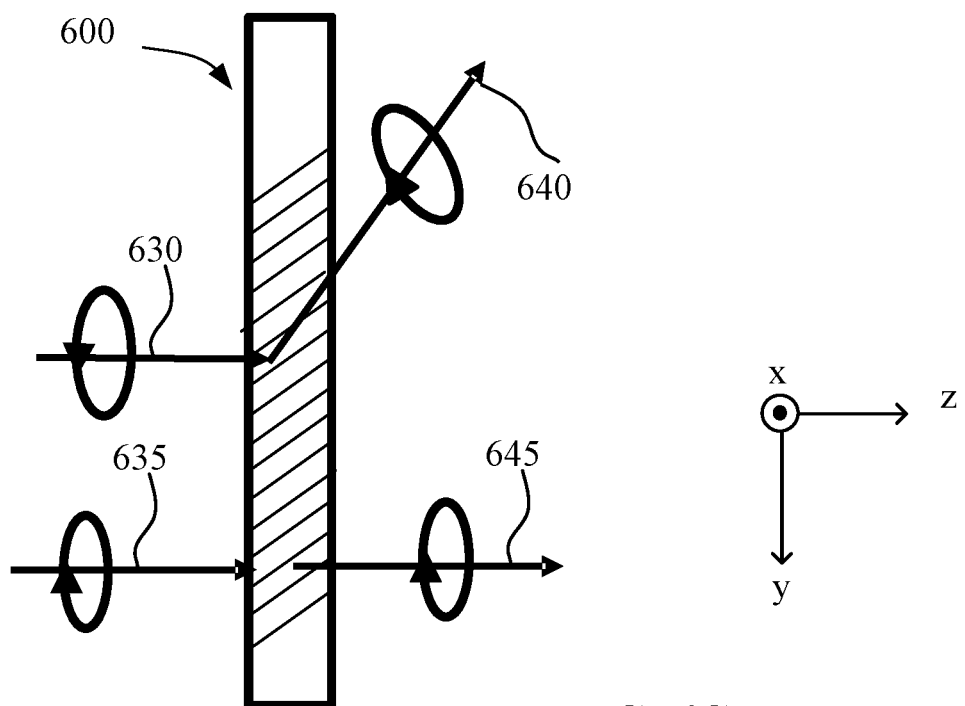
FIG. 6C schematically illustrates polarization selective diffractions of a polarization selective segment, according to another embodiment of the present disclosure.
Figure 6D:
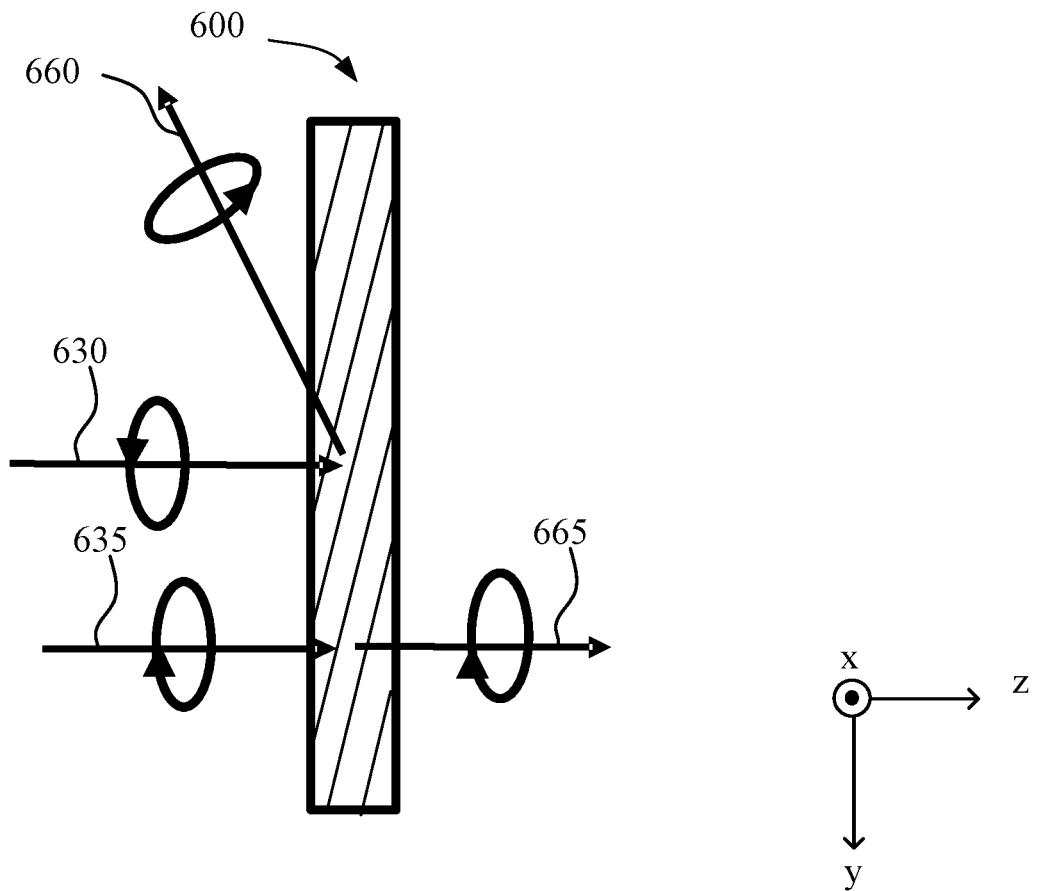
FIG. 6D schematically illustrates polarization selective diffractions of a polarization selective segment, according to another embodiment of the present disclosure.

Although not shown, the LC molecules located in close proximity to or at a surface of the birefringent film (or the optic axis of the birefringent film at a surface of the birefringent film) may be configured to have other suitable in-plane orientation patterns, such as an in-plane orientation pattern corresponding to a prism pattern, a cylindrical lens pattern, a lens array pattern, an off-axis focusing lens, or a phase retarder (e.g., quarter-wave plate, half-wave plate, etc.), etc. For discussion purposes, the polarization selective segments shown in FIGS. 4A-5D may be transmissive polarization selective segments. In some embodiments, the polarization selective segment may be a reflective polarization selective segment. An exemplary reflective polarization selective segment 600 is shown in FIGS. 6A-6D. FIGS. 6A and 6B schematically illustrate a y-z sectional view of a portion of out-of-plane orientations of the directors of LC molecules 612 in a birefringent film 605 of the polarization selective segment 600, according to various embodiments of the present disclosure. FIGS. 6C and 6D illustrate polarization selective diffractions of the polarization selective segment 600, according to an embodiment of the present disclosure.

The polarization selective segment 600 may include elements that are the same as or similar to those included in the polarization selective segment 300, 330, 350, 370, 400, or 500 shown in FIG. 3A, 3B, 3C, 3D, 4A-4D, or 5A-5D. Detailed descriptions of the same or similar elements may refer to the above descriptions rendered in connection with FIG. 3A, 3B, 3C, 3D, 4A-4D, or 5A-5D. The birefringent film 605 may be similar to the birefringent film 305 shown in FIG. 3A, 3B, 3C, or 3D, the birefringent film 400 shown in FIGS. 4A and 4B, or the birefringent film 500 shown in FIG. 5A. The birefringent film 605 may include a first surface 605-1 and a second surface 605-2 opposite to the first surface 605-1. In a region substantially close to (including at) a surface (e.g., at least one of the first surface 605-1 or the second surface 605-2) of the birefringent film 605, the optic axis of the birefringent film 605 may rotate periodically in a predetermined in-plane direction (e.g., a y-axis direction) with a uniform (or same) in-plane pitch $P_{in}$.

The birefringent film 605 may include a birefringent material having a chirality (e.g., chiral nematic liquid crystals). The x-y sectional view of in-plane orientations of the LC molecules 612 located in close proximity to or at a surface (e.g., at least one of the first surface 605-1 or the second surface 605-2) of the birefringent film 605 may be similar to the x-y sectional view of the in-plane orientations of the LC molecules 412 in the birefringent film 405 as shown in FIG. 4A. That is, the in-plane orientations of the LC molecules 612 may vary continuously and periodically in at least one in-plane direction with a uniform (or same) in-plane pitch $P_{in}$.

In the embodiment shown in FIGS. 6A and 6B, within a volume of the birefringent film 605, the LC molecules 612 may be arranged in a plurality of helical structures 617 with a plurality of helical axes 618 and a helical pitch along the helical axes 618. The azimuthal angles of the LC molecules 612 in a single helical structure 617 may continuously vary around a helical axis 618 in a predetermined rotation direction, e.g., clockwise direction or counter-clockwise direction. In other words, the LC directors of the LC molecules 612 in a single helical structure 617 may continuously rotate around the helical axis 618 in a predetermined rotation direction to continuously change the azimuthal angle. Accordingly, the helical structure 617 may exhibit a handedness, e.g., right handedness or left handedness.

In the embodiment shown in FIG. 6A, the helical axes 618 may be substantially perpendicular to the first surface 605-1 and/or the second surface 605-2 of the birefringent film 605. In other words, the helical axes 618 of the helical structures 617 may extend in a thickness direction (e.g., a z-axis direction) of the birefringent film 605. That is, the LC molecules 612 may have substantially small pretilt angles (including zero degree pretilt angles) with respect to the first surface 605-1 or the second surface 605-2, and the LC directors of the LC molecules 612 may be substantially orthogonal to the helical axis 618. In the embodiment shown in FIG. 6B, the helical axes 618 of helical structures 617 may be tilted with respect to the first surface 605-1 and/or the second surface 605-2 of the birefringent film 605 (or with respect to the thickness direction of the birefringent film 605). For example, the helical axes 618 of the helical structures 617 may have an acute angle with respect to the first surface 605-1 and an obtuse angle with respect to the second surface 605-2 of the birefringent film 605.

Referring to FIGS. 6A and 6B, the birefringent film 605 may have a vertical pitch Pv, which may be defined as a distance along the thickness direction of the birefringent film 605 over which the LC directors of the LC molecules 612 rotate by a predetermined angle (e.g., 180°) or the azimuthal angles of the LC directors vary by a predetermined angle (e.g., 180°) from a predetermined initial state. The LC molecules 612 from the plurality of helical structures 617 having a first same orientation (e.g., same tilt angle and azimuthal angle) may form a first series of parallel refractive index planes 614 periodically distributed within the volume of the birefringent film 605.

Although not labeled, the LC molecules 612 with a second same orientation (e.g., same tilt angle and azimuthal angle) different from the first same orientation may form a second series of parallel refractive index planes periodically distributed within the volume of the birefringent film 605. Different series of parallel refractive index planes may be formed by the LC molecules 612 having different orientations. In the same series of parallel and periodically distributed refractive index planes 614, the LC molecules 612 may have the same orientation and the refractive index may be the same. Different series of refractive index planes may correspond to different refractive indices. In some embodiments, the series of parallel refractive index planes 614 may be slanted or parallel with respect to the first surface 605-1 or the second surface 605-2.

When the number of the refractive index planes (or the thickness of the birefringent medium film) increases to a sufficient value, Bragg diffraction may be established according to the principles of volume gratings. The periodically distributed refractive index planes 614 may also be referred to as Bragg planes 614. A distance (or a period) between adjacent Bragg planes 614 of the same series may be referred to as a Bragg period PB. The different series of Bragg planes formed within the volume of the birefringent film 605 may produce a varying refractive index profile that is periodically distributed in the volume of the birefringent film 605. The birefringent film 605 may modulate (e.g., diffract) an input light satisfying a Bragg condition through Bragg diffraction.

In some embodiments, the polarization selective segment 600 including the birefringent film 605 having the LC molecules 612 configured with the in-plane orientations as shown in FIG. 4A and the out-of-plane orientations as shown in FIG. 6A or FIG. 6B may function as a reflective polarization volume grating ("PVG") or a polarization volume hologram ("PVH") grating, which may modulate a circularly polarized light through Bragg diffraction. The diffraction efficiency of the reflective PVG 600 or the PVH grating 600 may be a function of the thickness of the birefringent film 605. For example, the diffraction efficiency of the reflective PVG 600 or the PVH grating 600 may increase monotonically with the thickness and then gradually saturate (e.g., remain substantially constant).

FIGS. 6C and 6D illustrate polarization selective diffractions of the reflective PVG 600 or the PVH grating 600, according to an embodiment of the present disclosure. For discussion purposes, PVH grating is used as an example. The PVH grating 600 may be a passive PVH grating or an active PVH grating. In some embodiments, the PVH grating may be configured to substantially (or primarily) diffract a circularly polarized light having a predetermined handedness via Bragg diffraction, and substantially (or primarily) transmit (e.g., with negligible diffraction) a circularly polarized light having a handedness that is opposite to the predetermined handedness. In some embodiments, Referring to FIGS. 6A and 6B, the handedness of the helical structures 617 may define the polarization selectivity of the PVH grating 600.

In some embodiments, the PVH grating 600 may be configured to substantially diffract a circularly polarized light having a handedness that is the same as the handedness of the helical structures 617, and substantially transmit (e.g., with negligible diffraction) a circularly polarized light having a handedness that is opposite to the handedness of the helical structures 617. In some embodiments, depending on the handedness of the helical structures 617 within the volume of the PVH grating 600, the PVH grating 600 may be referred to as a left-handed PVH grating or a right-handed PVH grating. For example, a left-handed PVH grating may be configured to substantially (forwardly or backwardly) diffract an LHCP light, and substantially transmit (e.g., with negligible diffraction) an RHCP light. A right-handed PVH grating may be configured to substantially (forwardly or backwardly) diffract an RHCP light and substantially transmit (e.g., with negligible diffraction) an LHCP light.

When the PVH grating 600 is configured to substantially forwardly diffract a circularly polarized light (or an elliptically polarized light) having the predetermined handedness, the PVH grating may be referred to as a transmissive PVH grating. For discussion purposes, FIG. 6C shows polarization selective diffractions of the PVH grating 600 functioning as a transmissive, right-handed PVH grating. As shown in FIG. 6C, the PVH grating 600 may be configured to substantially forwardly diffract an RHCP light 630 as a diffracted light (e.g., the $1^{st}$ order diffracted light) 640, and substantially transmit (e.g., with negligible diffraction) an LHCP light 635 as a transmitted light (e.g., the $0^{th}$ order) 645. In some embodiments, the diffracted light 640 output from the PVH grating 600 may be a circularly polarized light with a handedness reversed by the PVH grating 600. For example, the diffracted light 640 may be an LHCP light. In some embodiments, the transmitted light 645 may be a circularly polarized light with a handedness substantially maintained by the PVH grating 600. For example, the transmitted light 645 may be an LHCP light. Thus, the PVH grating 600 may change the polarization of a light while diffracting the light.

When the PVH grating is configured to substantially backwardly diffract the circularly polarized light (or the elliptically polarized light) having the predetermined handedness, the PVH grating may be referred to as a reflective PVH grating. For discussion purposes, FIG. 6D shows polarization selective diffractions of the PVH grating 600 functioning as a reflective, right-handed PVH grating. As shown in FIG. 6D, the PVH grating 600 may be configured to substantially backwardly diffract an RHCP light 630 as a diffracted light (e.g., the $1^{st}$ order diffracted light) 660, and substantially transmit (e.g., with negligible diffraction) an LHCP light 635 as a transmitted light (e.g., the $0^{th}$ order) 665. In some embodiments, the diffracted light 660 and the transmitted light 665 may be circularly polarized lights with handedness substantially maintained by the PVH grating 600. For example, the diffracted light 660 may be an RHCP light, and the transmitted light 665 may be an RHCP light.

FIGS. 7A-7D schematically illustrate diagrams of polarization selective devices, according to various embodiments of the present disclosure. The polarization selective devices shown in FIGS. 7A-7D may include elements that are similar to or the same as those included in other polarization selective devices disclosed herein and shown in other figures. Features shown in other figures, even if not explicitly described below for the simplicity of discussion, may also be applicable to the embodiment shown in FIGS. 7A-7D. Descriptions of the same or similar elements or features can refer to the above corresponding descriptions, including those rendered in connection with FIGS. 1A-6D.

Figure 7A:
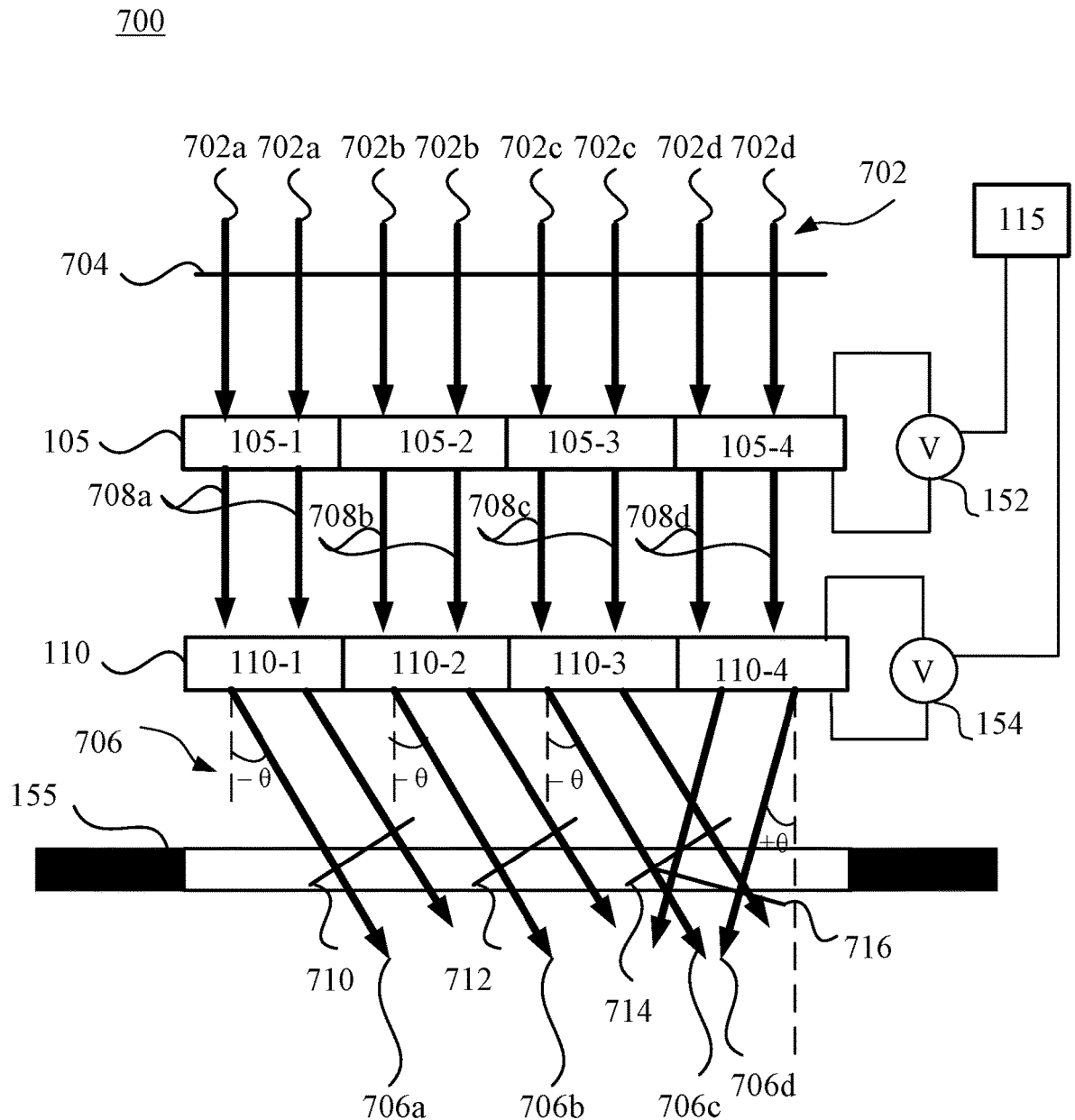
FIGS. 7A-7D schematically illustrate diagrams of polarization selective devices, according to various embodiments of the present disclosure.

FIG. 7A schematically illustrates a y-z sectional view of a polarization selective device 700, according to an embodiment of the present disclosure. As shown in FIG. 7A, the polarization selective device 700 may include the segmented SHWP 105, the PBP element 110 optically coupled to the segmented SHWP 105, and the controller 115. For illustrative purposes, the segmented SHWP 105 is shown as including four SHWP segments 105-1, 105-2, 105-3, and 105-4 arranged in a 1D array, and the PBP element 110 is shown as including four PBP segments 110-1, 110-2, 110-3, and 110-4 arranged in a 1D array. The SHWP segments 105-1, 105-2, 105-3, and 105-4 may be optically coupled to the PBP segments 110-1, 110-2, 110-3, and 110-4, respectively, and may be configured to control the optical states of the PBP segments 110-1, 110-2, 110-3, and 110-4, respectively.

In the embodiment shown in FIG. 7A, the PBP segments 110-1, 110-2, 110-3, and 110-4 may include polarization selective gratings, such as PBP gratings shown in FIGS. 4A-4D. For discussion purposes, the PBP gratings included in the PBP segments 110-1, 110-2, 110-3, and 110-4 are also referred to as 110-1, 110-2, 110-3, and 110-4, respectively. In some embodiments, the PBP gratings 110-1, 110-2, 110-3, and 110-4 may be active or passive PBP gratings. In some embodiments, the PBP gratings 110-1, 110-2, 110-3, and 110-4 may include at least one active PBP grating and at least one passive grating. Active PBP gratings may be electrically coupled to corresponding power sources controlled by the controller 115. For illustrative and discussion purposes, the PBP gratings 110-1, 110-2, 110-3, and 110-4 are shown in FIG. 7A as active gratings. The power source 154 electrically coupled to the PBP grating 110-4 is shown for illustrative purposes. In some embodiments, the power source 154 may also be electrically coupled to the PBP gratings 110-1, 110-2, and 110-3, and may provide voltages to the PBP gratings 110-1, 110-2, 110-3, and 110-4 independently. In some embodiments, multiple power sources may be electrically coupled to the PBP gratings 110-1, 110-2, 110-3, and 110-4, and may provide voltages to the PBP gratings 110-1, 110-2, 110-3, and 110-4 independently.

In the embodiment shown in FIG. 7A, the PBP gratings 110-1, 110-2, 110-3, and 110-4 may have a substantially same in-plane pitch. In some embodiments, the PBP gratings 110-1, 110-2, 110-3, and 110-4 may have the same polarization selectivity. For example, the PBP gratings 110-1, 110-2, 110-3, and 110-4 may operate in a positive state for an RHCP light and operate in a negative state for an LHCP light. In some embodiments, the PBP gratings 110-1, 110-2, 110-3, and 110-4 may have different polarization selectivities. For example, at least two of the PBP gratings 110-1, 110-2, 110-3, and 110-4 may have different polarization selectivities. In some embodiments, at least one of the PBP gratings 110-1, 110-2, 110-3, and 110-4 may operate in a positive state for an RHCP light and operate in a negative state for an LHCP light, and at least of the PBP gratings 110-1, 110-2, 110-3, and 110-4 may operate in a positive state for an LHCP light and operate in a negative state for an RHCP light.

In the embodiment shown in FIG. 7A, an input light 702 may be a circularly polarized light, e.g., an RHCP light. The RHCP light 702 may have a planar wavefront 704, and may be substantially normally incident onto the polarization selective device 700. For discussion purposes, FIG. 7A shows the input light 702 as including eight rays, rays 702a, 702b, 702c, and 702d that may be incident onto the SHWP segments 105-1, 105-2, 105-3, and 105-4, respectively. The controller 115 may individually or independently control the corresponding power sources to control the SHWP segment 105-1, 105-2, 105-3, or 105-4 to operate at a predetermined operation state, e.g., a switching state or a non-switching state. For example, the controller 115 may individually or independently control the corresponding power sources of the SHWP segments 105-1, 105-2, 105-3, and 105-4, such that the SHWP segments 105-1, 105-2, and 105-3 may operate in a switching state, and the SHWP segment 105-4 may operate in a non-switching state. Thus, the SHWP segments 105-1, 105-2, and 105-3 may substantially change the polarizations of the rays 702a, 702b, and 702c, respectively, and the SHWP segment 105-4 may substantially maintain the polarizations of the rays 702d. For example, the SHWP segment 105-1, 105-2, 105-3, and 105-4 may output a light 708a (e.g., an LHCP light), a light 708b (e.g., an LHCP light), a light 708c (e.g., an LHCP light), and a light 708d (e.g., an RHCP light), respectively. For discussion purposes, two rays are shown in each of the lights 708a, 708b 708c, and 708b, and the two rays included in each of the lights 708a, 708b 708c, and 708b are also referred to as 708a, 708b, 708c, and 708d, respectively.

The controller 115 may individually or independently control the corresponding power sources to supply voltages lower than a predetermined voltage to the PBP gratings 110-1, 110-2, 110-3, and 110-4. As the PBP gratings 110-1, 110-2, 110-3, and 110-4 are configured to operate in the positive state for an RHCP light and in the negative state for an LHCP light, the PBP gratings 110-1, 110-2, and 110-3 may operate in the negative state for the lights 708a, 708b, and 708c (e.g., LHCP lights), respectively, and diffract the lights 708a, 708b, and 708c to a negative angle −θ, respectively. The PBP grating 110-4 may operate in the positive state for the light 708d (e.g., an RHCP light) and diffract the light 708d to a positive angle +θ.

That is, the PBP grating 110-1 may diffract the light 708a (e.g., an LHCP light) as a light 706a (e.g., an RHCP light) having the negative diffraction angle −θ and a planar wavefront 710. The PBP grating 110-3 may diffract the light 708b (e.g., an LHCP light) as a light 706b (e.g., an RHCP light) having the negative diffraction angle −θ and a planar wavefront 712. The PBP grating 110-3 may diffract the light 708c (e.g., an LHCP light) as a light 706c (e.g., an RHCP light) having the negative diffraction angle −θ and a planar wavefront 714. The PBP grating 110-4 may diffract the light 708d (e.g., an RHCP light) as a light 706d (e.g., an LHCP light) having the positive diffraction angle +θ and a planar wavefront 716. Thus, the lights 706a, 706b, 706c respectively output from the polarization selective device 700 at the PBP segments 110-1, 110-2, and 110-3 may have a substantially same propagation direction, and the light 706d output from the polarization selective device 700 at the PBP segment 110-4 may have a propagation direction different from the propagation directions of the lights 706a, 706b, 706c.

In some embodiments, an overall optical output (or an overall output light) 706 of the polarization selective device 700 based on the input light 702 may be a combination of the output lights 706a, 706b, 706c, and 706d. Thus, the polarization selective device 700 may be configured to output lights in any desirable directions across different regions of the predetermined clear aperture 155 based on an input light having a single incidence angle. As a result, the lights output at local regions of the clear aperture 155 may be non-uniformly varied. In some embodiments, at the predetermined clear aperture 155, a wavefront of the overall output light 706 may be a combination of the wavefronts 710, 712, 714, and 716 of the local output lights 706a, 706b, 706c, and 706d. Thus, across the predetermined clear aperture 155, the wavefront of the overall output light 706 may not be a planar wavefront. Instead, the wavefront of the overall output light 706 may be a curved wavefront including four planar segments.

Figure 7B:
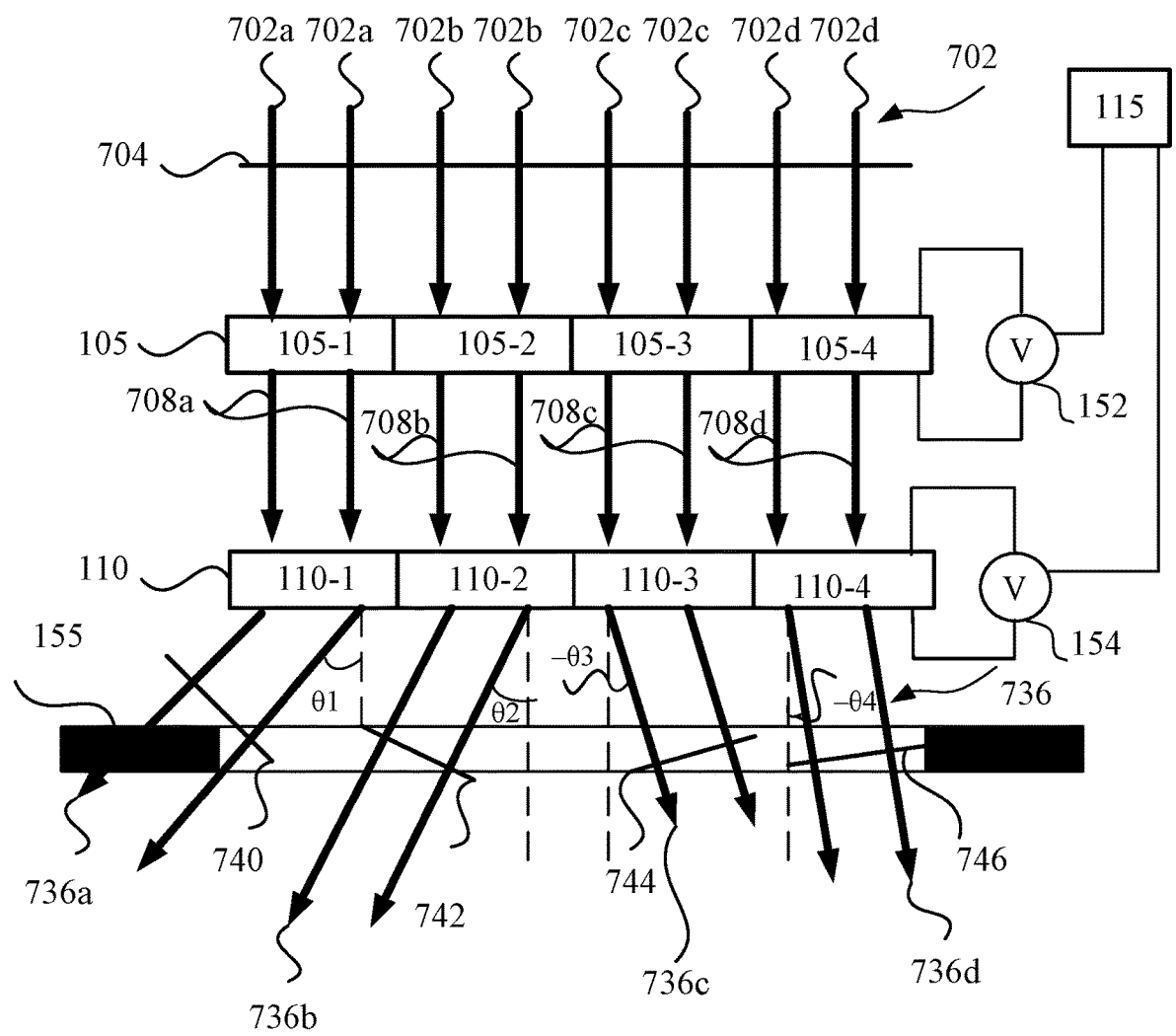
Figure 7B:
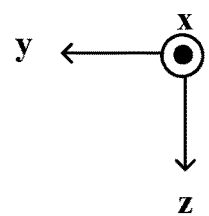

FIG. 7B schematically illustrates a y-z sectional view of a polarization selective device 730, according to an embodiment of the present disclosure. In the embodiment shown in FIG. 7B, the PBP gratings 110-1, 110-2, 110-3, and 110-4 may have different in-plane pitches. For example, at least two of the PBP gratings 110-1, 110-2, 110-3, and 110-4 may have different in-plane pitches. For discussion purposes, FIG. 7B shows the PBP gratings 110-1, 110-2, 110-3, and 110-4 as active PBP gratings, which are electrically coupled to corresponding power sources, respectively (not all power sources are shown). The PBP gratings 110-1, 110-2, 110-3, and 110-4 may have different in-plane pitches. For example, the in-plane pitches of the PBP gratings 110-1, 110-2, 110-3, and 110-4 may gradually increase. The PBP gratings 110-1, 110-2, 110-3, and 110-4 may have the same polarization selectivity. For example, the PBP gratings 110-1, 110-2, 110-3, and 110-4 may operate in a positive state for an RHCP light and operate in a negative state for an LHCP light.

In the embodiment shown in FIG. 7B, an input light 702 may be a circularly polarized light (e.g., an RHCP light) having a planar wavefront 704. The input light 702 may be substantially normally incident onto the polarization selective device 730. For discussion purposes, the controller 115 may control the corresponding power sources of the SHWP segments 105-1, 105-2, 105-3, and 105-4, such that the SHWP segments 105-1 and 105-2 may operate in a non-switching state, and the SHWP segments 105-3 and 105-4 may operate in a switching state. Thus, the SHWP segments 105-1 and 105-2 may substantially maintain the polarizations of the rays 702a and 702b, respectively, and the SHWP segments 105-3 and 105-4 may change the polarizations of the rays 702c and 702d, respectively. For example, for the circularly polarized light (e.g., an RHCP light) 702, the SHWP segment 105-1, 105-2, 105-3, and 105-4 may output a light 708a (e.g., an RHCP light), a light 708b (e.g., an RHCP light), a light 708c (e.g., an LHCP light), and a light 708d (e.g., an LHCP light), respectively.

The controller 115 may individually or independently control the corresponding power sources to supply voltages lower than a predetermined voltage to the PBP gratings 110-1, 110-2, 110-3, and 110-4. As the PBP gratings 110-1, 110-2, 110-3, and 110-4 are configured to operate in the positive state for an RHCP light and in the negative state for an LHCP light, the PBP grating 110-1 may operate in the positive state for the light 708a (e.g., an RHCP light) and diffract the light 708a to a positive angle θ1. The PBP grating 110-2 may operate in the positive state for the light 708b (e.g., an RHCP light) and diffract the light 708b to a positive angle θ2. The PBP grating 110-3 may operate in the negative state for the light 708c (e.g., an LHCP light) and diffract the light 708c to a negative angle −θ3. The PBP grating 110-4 may operate in the negative state for the light 708d (e.g., an LHCP light) and diffract the light 708d to a negative angle −θ4.

That is, the PBP grating 110-1 may diffract the light 708a (e.g., an RHCP light) as a light 736a (e.g., an LHCP light) having the positive diffraction angle θ1 and a planar wavefront 740. The PBP grating 110-2 may diffract the light 708b (e.g., an RHCP light) as a light 736b (e.g., an LHCP light) having the positive diffraction angle θ2 and a planar wavefront 742. The PBP grating 110-3 may diffract the light 708c (e.g., an LHCP light) as a light 736c (e.g., an RHCP light) having the negative diffraction angle −θ3 and a planar wavefront 744. The PBP grating 110-4 may diffract the light 708d (e.g., an LHCP light) as a light 736d (e.g., an RHCP light) having the negative diffraction angle −θ4 and a planar wavefront 746.

As the in-plane pitches of the PBP gratings 110-1, 110-2, 110-3, and 110-4 may gradually increase, the absolute values of the diffraction angles θ1, θ2, θ3, and θ4 may gradually decrease. Thus, the lights 736a, 736b, 736c, and 736d output from the polarization selective device 730 may have different propagation directions. In some embodiments, an overall optical output (or an overall output light) 736 of the polarization selective device 730 based on the input light 702 may be a combination of the local output lights 736a, 736b, 736c, and 736d. Thus, the polarization selective device 730 may be configured to output lights in any desirable directions across different regions of the predetermined clear aperture 155 based on an input light having a single incidence angle. As a result, the lights output at local regions of the clear aperture 155 may be non-uniformly varied. In some embodiments, at the predetermined clear aperture 155, a wavefront of the overall output light 736 may be a combination of the wavefronts 740, 742, 744, and 746 of the local output lights 736a, 736b, 736c, and 736d. Thus, across the predetermined clear aperture 155, the wavefront of the overall output light 736 may not be a planar wavefront. Instead, the wavefront of the overall output light 736 may be a curved wavefront including four planar segments.

Figure 7C:
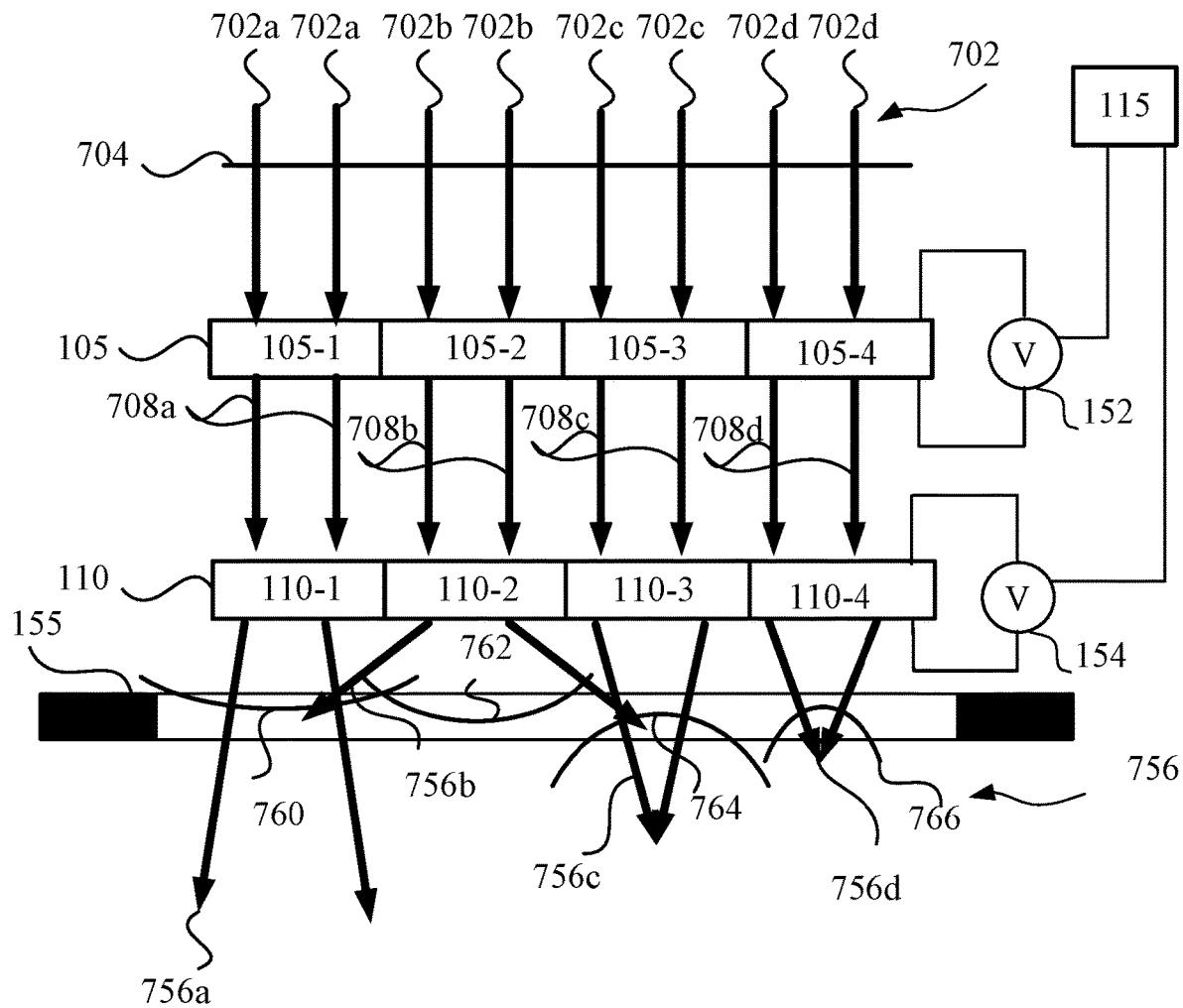

FIG. 7C schematically illustrates a y-z sectional view of a polarization selective device 750, according to another embodiment of the present disclosure. In the embodiment shown in FIG. 7C, the PBP segments 110-1, 110-2, 110-3, and 110-4 may include polarization selective lenses, such as the PBP lenses shown in FIGS. 5A-5D. For discussion purposes, the PBP lenses included in the PBP segments 110-1, 110-2, 110-3, and 110-4 are also referred to as 110-1, 110-2, 110-3, and 110-4, respectively. In some embodiments, the PBP lenses 110-1, 110-2, 110-3, and 110-4 may be active or passive PBP lenses. In some embodiments, the PBP lenses 110-1, 110-2, 110-3, and 110-4 may include at least one active PBP lens and at least one passive lens. Active PBP lenses may be electrically coupled to corresponding power sources controlled by the controller 115.

In some embodiments, the PBP lenses 110-1, 110-2, 110-3, and 110-4 may have a substantially same focal length. In some embodiments, the PBP lenses 110-1, 110-2, 110-3, and 110-4 may have different focal lengths. For example, at least two of the PBP lenses 110-1, 110-2, 110-3, and 110-4 may have different focal lengths. In some embodiments, the PBP lenses 110-1, 110-2, 110-3, and 110-4 may have the same polarization selectivity. For example, the PBP lenses 110-1, 110-2, 110-3, and 110-4 may operate in a defocusing state for an RHCP light and in a focusing state for an LHCP light. In some embodiments, the PBP lenses 110-1, 110-2, 110-3, and 110-4 may have different polarization selectivities. For example, at least two of the PBP lenses 110-1, 110-2, 110-3, and 110-4 may have different polarization selectivities.

In some embodiments, at least one of the PBP lenses 110-1, 110-2, 110-3, and 110-4 may operate in a defocusing state for an RHCP light and in a focusing state for an LHCP light, and at least of the PBP lenses 110-1, 110-2, 110-3, and 110-4 may operate in a defocusing state for an LHCP light and in a focusing state for an RHCP light. For discussion purposes, FIG. 7A shows the PBP lenses 110-1, 110-2, 110-3, and 110-4 as active lenses. The power source 154 is shown as being electrically coupled to the PBP lens 110-4. In some embodiments, the power source 154 may also be electrically coupled to the PBP lenses 110-1, 110-2, and 110-3, and may provide voltages to the PBP lenses 110-1, 110-2, 110-3, and 110-4 independently. In some embodiments, individual powers sources may be electrically coupled to corresponding PBP lenses 110-1, 110-2, 110-3, and 110-4 to provide voltages independently. The PBP lenses 110-1, 110-2, 110-3, and 110-4 may have different focal lengths. For example, the focal lengths of the PBP lenses 110-1, 110-2, 110-3, and 110-4 may gradually reduce. The PBP lenses 110-1, 110-2, 110-3, and 110-4 may have the same polarization selectivity. For example, the PBP lenses 110-1, 110-2, 110-3, and 110-4 may operate in a defocusing state for an RHCP light and in a focusing state for an LHCP light.

In the embodiment shown in FIG. 7C, the input light 702 may be a circularly polarized light (e.g., an RHCP light) having the planar wavefront 704. The input light 702 may be substantially normally incident onto the polarization selective device 750. For discussion purposes, the controller 115 may control the corresponding power sources of the SHWP segments 105-1, 105-2, 105-3, and 105-4, such that the SHWP segments 105-1 and 105-2 may operate in a non-switching state, and the SHWP segments 105-3 and 105-4 may operate in a switching state. Thus, the SHWP segments 105-1 and 105-2 may substantially maintain the polarizations of the rays 702a and 702b, respectively, and output the light 708a (e.g., an RHCP light) and the light 708b (e.g., an RHCP light), respectively. The SHWP segments 105-3 and 105-4 may change the polarizations of the rays 702c and 702d, respectively, and output the light 708c (e.g., an LHCP light) and the light 708d (e.g., an LHCP light), respectively.

The controller 115 may individually or independently control the corresponding power sources to supply voltages lower than a predetermined voltage to the PBP lenses 110-1, 110-2, 110-3, and 110-4. As the PBP lenses 110-1, 110-2, 110-3, and 110-4 may be configured to operate in the defocusing state for an RHCP light and in the focusing state for an LHCP light, the PBP lens 110-1 may operate in the defocusing state for the light 708a (e.g., an RHCP light) and defocus the light 708a as a divergent light 756a (e.g., an LHCP light). The PBP lens 110-2 may operate in the defocusing state for the light 708b (e.g., an RHCP light) and defocus the light 708b as a divergent light 756b (e.g., an LHCP light). The PBP lens 110-3 may operate in the focusing state for the light 708c (e.g., an LHCP light) and focus the light 708c as a convergent light 756c (e.g., an RHCP light). The PBP lens 110-4 may operate in the focusing state for the light 708d (e.g., an LHCP light) and focus the light 708d as a convergent light 756d (e.g., an RHCP light). At the predetermined clear aperture 155, the lights 756a and 756b output from the PBP lenses 110-1 and 110-2 may have diverging spherical wavefronts 760 and 762, respectively. The lights 756c and 756d output from the PBP lenses 110-3 and 110-4 may have converging spherical wavefronts 764 and 766, respectively. In some embodiments, as the focal lengths of the PBP lenses 110-1, 110-2, 110-3, and 110-4 gradually decrease, at the predetermined clear aperture 155, the absolute values of the radiuses of curvature of the spherical wavefronts 760, 762, 764, and 766 may gradually decrease.

In some embodiments, an overall optical output (or an overall output light) 756 of the polarization selective device 750 based on the input light 702 may be a combination of the local output lights 756a, 756b, 756c, and 756d. In some embodiments, at the predetermined clear aperture 155, a wavefront of the overall output light 756 may be a combination of the wavefronts 760, 762, 764, and 766 of the local output lights 756a, 756b, 756c, and 756d. Thus, the polarization selective device 750 may be configured to output lights in any desirable directions across different regions of the predetermined clear aperture 155 based on an input light having a single incidence angle. As a result, the lights output at local regions of the clear aperture 155 may be non-uniformly varied. Across the predetermined clear aperture 155, the wavefront of the overall output light 756 may not be a substantially planar or spherical wavefront. Instead, the wavefront of the overall output light 756 may be a curved wavefront including four spherical segments of varying radii of curvature.

Figure 7D:
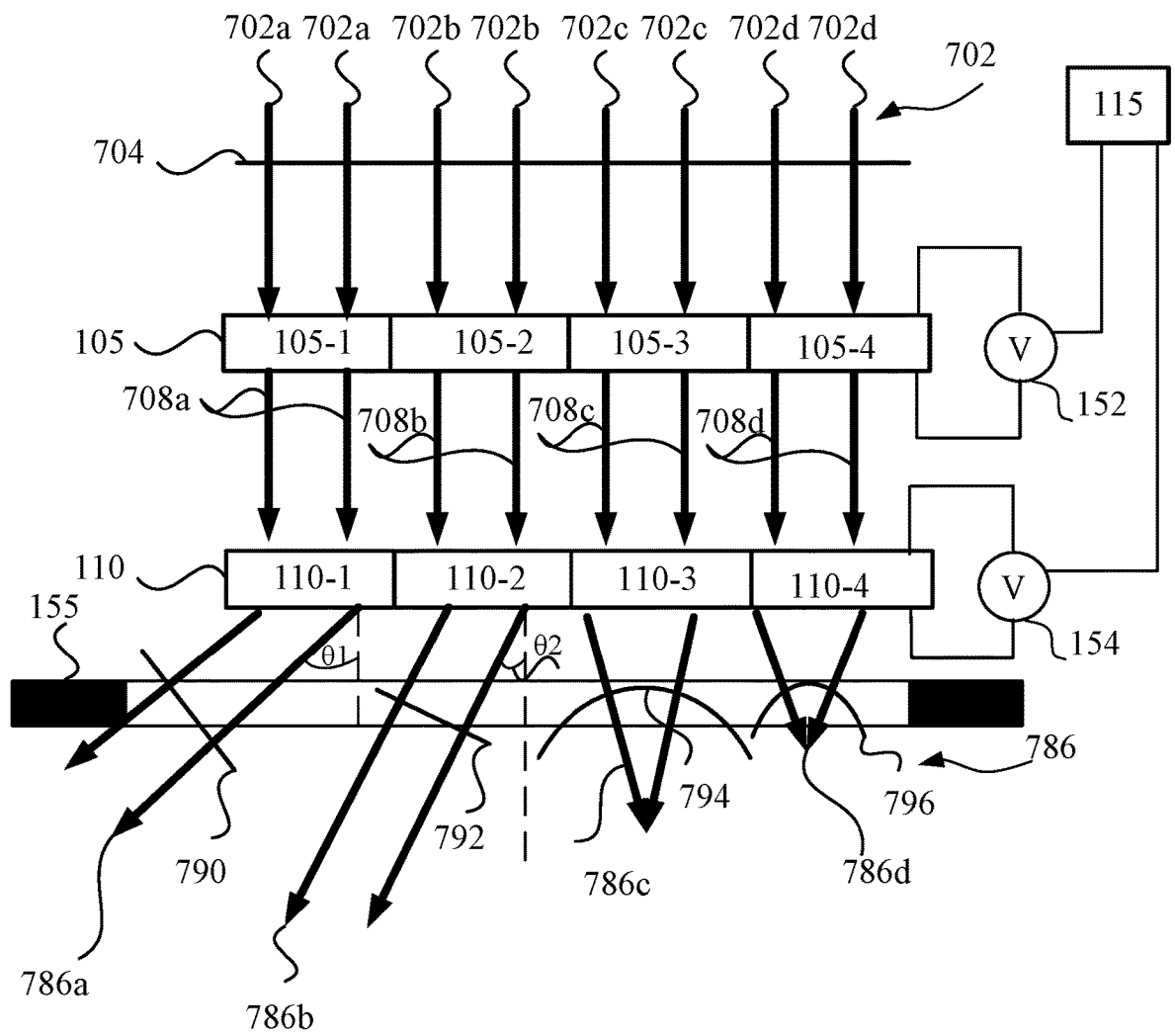

FIG. 7D schematically illustrates a y-z sectional view of a polarization selective device 780, according to another embodiment of the present disclosure. In the embodiment shown in FIG. 7D, the PBP segments 110-1, 110-2, 110-3, and 110-4 may include different types of polarization selective segments. For example, the PBP segments 110-1 and 110-2 may include PBP gratings (also referred to as 110-1 and 110-2 for discussion purposes), and the PBP segments 110-3 and 110-3 may include PBP lenses (also referred to as 110-3 and 110-4 for discussion purposes). The PBP gratings 110-1 and 110-2 and the PBP lenses 110-3 and 110-4 may be active or passive PBP segments. In some embodiments, the PBP gratings 110-1 and 110-2 and the PBP lenses 110-3 and 110-4 may include at least one active PBP segment and at least one passive PBP segment. Active PBP segments may be electrically coupled to corresponding power sources controlled by the controller 115.

For discussion purposes, FIG. 7D shows the PBP gratings 110-1 and 110-2 and the PBP lenses 110-3 and 110-4 as active PBP elements, which are electrically coupled to corresponding power sources, respectively. For discussion purposes, FIG. 7D shows that the power source 154 is electrically coupled to the PBP lens 110-4. In some embodiments, the power source 154 may also be electrically coupled to the PBP gratings 110-1 and 110-2 and the PBP lens 110-3. The power source 154 may supply voltages to the PBP gratings 110-1 and 110-2 and the PBP lenses 110-3 and 110-4 independently. In some embodiments, individual power sources may be electrically coupled to the PBP gratings 110-1 and 110-2 and the PBP lenses 110-3 and 110-4 to supply voltages independently. The PBP gratings 110-1 and 110-2 may be configured to have the same in-plane pitch or different in-plane pitches. The PBP gratings 110-1 and 110-2 may be configured with the same polarization selectivity or different polarization selectivities. The PBP lenses 110-3 and 110-4 may be configured to have the same focal length or different focal lengths. The PBP lenses 110-3 and 110-4 may be configured with the same polarization selectivity or different polarization selectivities.

In the embodiment shown in FIG. 7D, the input light 702 may be a circularly polarized light (e.g., an RHCP light) having the planar wavefront 704. The input light 702 may be substantially normally incident onto the polarization selective device 780. For discussion purposes, the controller 115 may control the corresponding power sources of the SHWP segments 105-1, 105-2, 105-3, and 105-4, such that the SHWP segments 105-1 and 105-2 may operate in a non-switching state, and the SHWP segments 105-3 and 105-4 may operate in a switching state. Thus, the SHWP segments 105-1 and 105-2 may substantially maintain the polarizations of the rays 702a and 702b, respectively, and output the light 708a (e.g., an RHCP light) and the light 708b (e.g., an RHCP light), respectively. The SHWP segments 105-3 and 105-4 may change the polarizations of the rays 702c and 702d, respectively, and output the light 708c (e.g., an LHCP light) and the light 708d (e.g., an LHCP light), respectively.

The controller 115 may individually or independently control the corresponding power sources to supply voltages lower than a predetermined voltage to the PBP segments 110-1, 110-2, 110-3, and 110-4. As the PBP gratings 110-1 and 110-2 may be configured to operate in the positive state for an RHCP light and in the negative state for an LHCP light, the PBP grating 110-1 may operate in the positive state for the light 708a (e.g., an RHCP light) and diffract the light 708a to a positive angle θ1. The PBP grating 110-2 may operate in the positive state for the light 708b (e.g., an RHCP light) and diffract the light 708b to a positive angle θ2. That is, the PBP grating 110-1 may diffract the light 708a (e.g., an RHCP light) as a light 786a (e.g., an LHCP light) having the positive diffraction angle θ1 and a planar wavefront 790. The PBP grating 110-2 may diffract the light 708b (e.g., an RHCP light) as a light 786b (e.g., an LHCP light) having the positive diffraction angle θ2 and a planar wavefront 792. When the in-plane pitches of the PBP gratings 110-1 and 110-2 are configured to gradually increase, the absolute values of the diffraction angles θ1 and θ2 may gradually decrease.

As the PBP lenses 110-3, and 110-4 may be configured to operate in the defocusing state for an RHCP light and the focusing state for an LHCP light, the PBP lens 110-3 may operate in the focusing state for the light 708c (e.g., an LHCP light) and focus the light 708c as a convergent light 786c (e.g., an RHCP light). The PBP lens 110-4 may operate in the focusing state for the light 708d (e.g., an LHCP light) and focus the light 708d as a convergent light 786d (e.g., an RHCP light). At the predetermined clear aperture 155, the lights 786c and 786d output from the polarization selective device 780 may have converging spherical wavefronts 794 and 796, respectively. In some embodiments, when the focal lengths of the PBP lenses 110-3 and 110-4 are configured to gradually decrease, at the predetermined clear aperture 155, the absolute values of the radii of curvature of the converging spherical wavefronts 794 and 796 may gradually decrease.

In some embodiments, an overall optical output (or an overall output light) 786 of the polarization selective device 780 based on the input light 702 may be a combination of the local output lights 786a, 786b, 786c, and 786d. In some embodiments, at the predetermined clear aperture 155, a wavefront of the overall output light 786 may be a combination of the wavefronts 790, 792, 794, and 796 of the local output lights 786a, 786b, 786c, and 786d. Thus, the polarization selective device 780 may be configured to output lights in any desirable directions across different regions of the predetermined clear aperture 155 based on an input light having a single incidence angle. As a result, the lights output at local regions of the clear aperture 155 may be non-uniformly varied. Across the predetermined clear aperture 155, the wavefront of the overall output light 786 may not be a substantially planar or spherical wavefront. Instead, the wavefront of the overall output light 786 may be a curved wavefront including two planar segments having varying propagation directions and two spherical segments having varying radii of curvature.

In the embodiments shown in FIGS. 7A-7D, for illustrative and discussion purposes, PBP segments (e.g., PBP gratings, PBP lenses) are used as examples of polarization selective segments. Although not shown, in some embodiments, the polarization selective segment 110-1, 110-2, 110-3, or 110-4 may include suitable polarization selective segment other than the PBP segments. In addition, the polarization selective segment 110-1, 110-2, 110-3, or 110-4 may include any suitable polarization selective segment, such as a polarization selective prism, a polarization selective phase retarder, a polarization selective off-axis focusing lens, or a polarization selective freeform lens, etc.

Figure 8A:
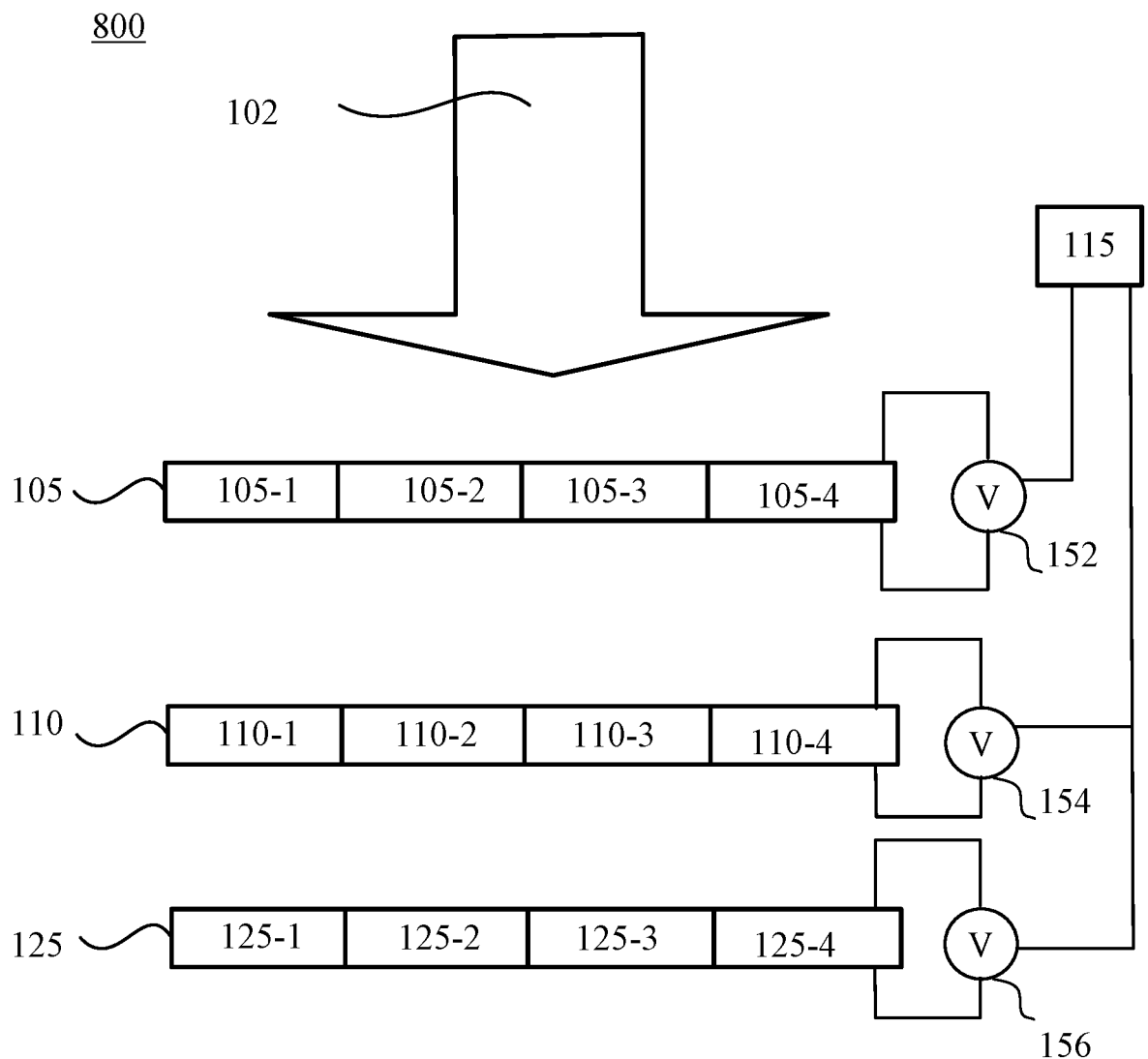
FIGS. 8A-8C schematically illustrate diagrams of polarization selective devices, according to various embodiments of the present disclosure.
Figure 8B:
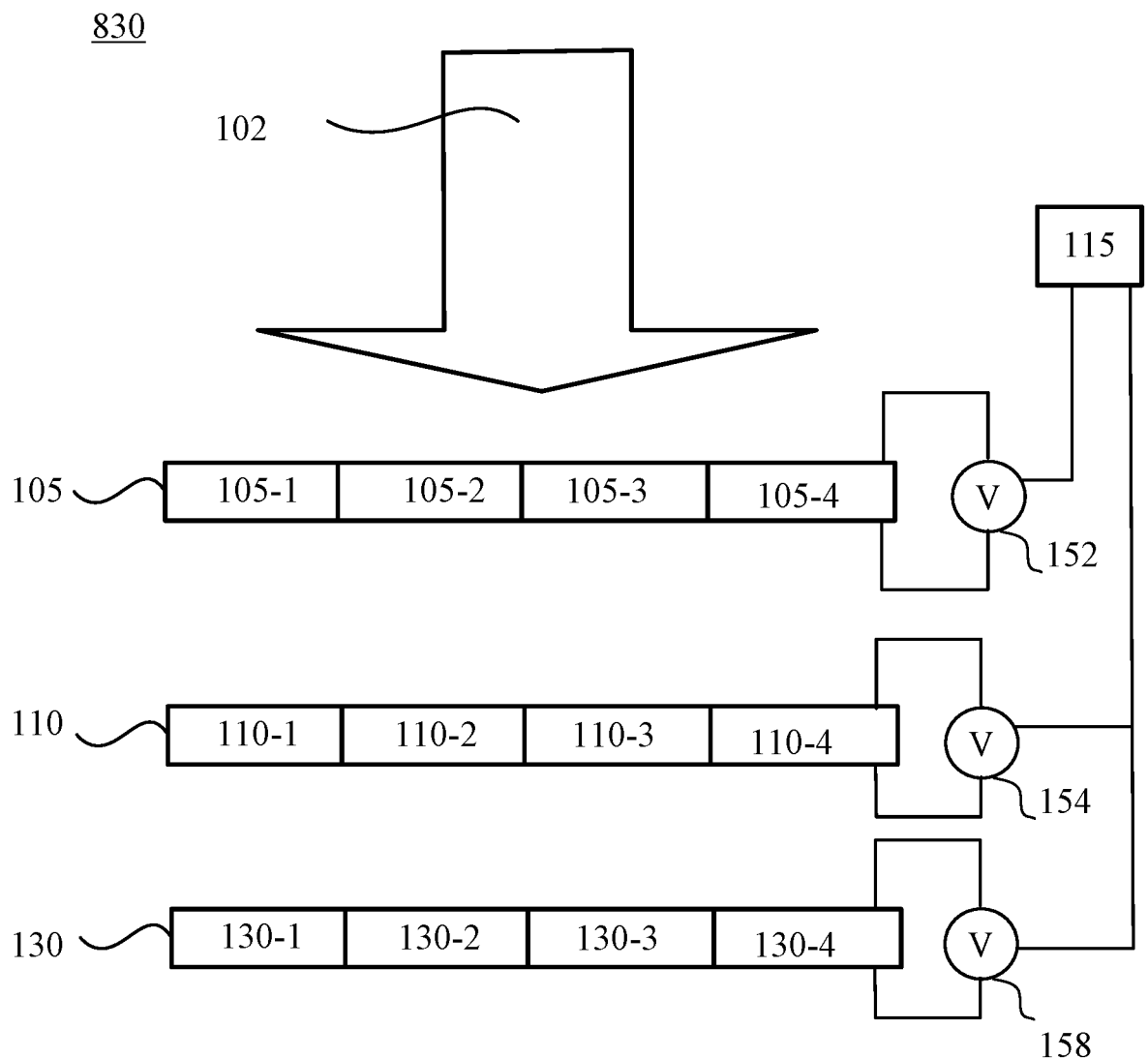
Figure 8B:
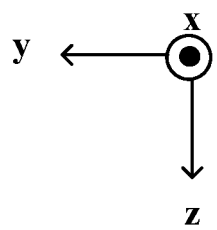
Figure 8C:
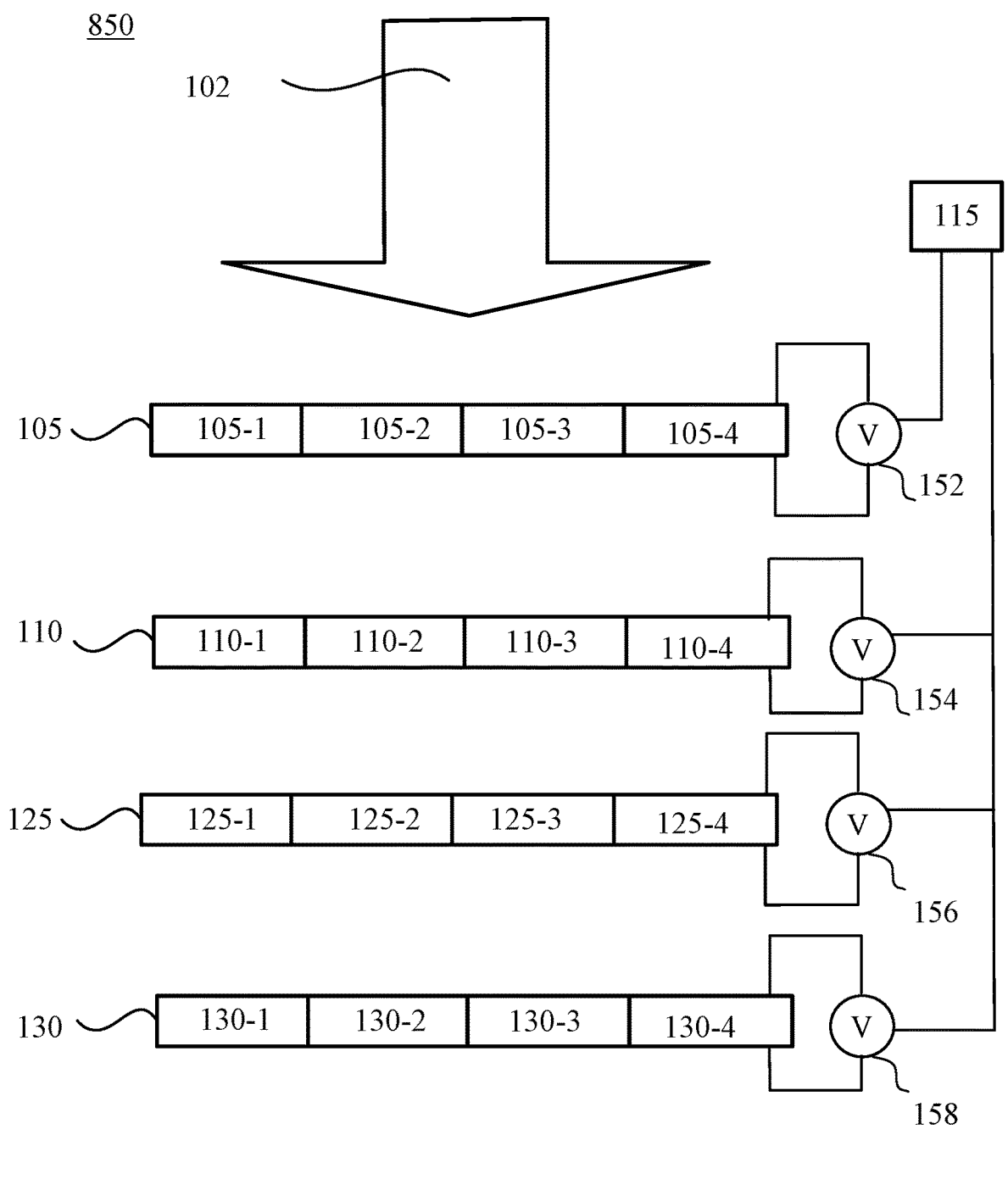
Figure 8C:
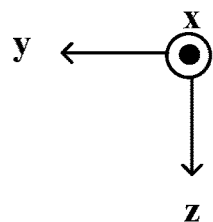

FIGS. 8A-8C schematically illustrate diagrams of polarization selective devices, according to various embodiments of the present disclosure. The polarization selective devices shown in FIGS. 8A-8C may include elements that are similar to or the same as those included in other polarization selective devices disclosed herein and shown in other figures. Features shown in other figures, even if not explicitly described below for the simplicity of discussion, may also be applicable to the embodiment shown in FIGS. 8A-8C. Descriptions of the same or similar elements or features can refer to the above corresponding descriptions, including those rendered in connection with FIGS. 1A-7D.

FIG. 8A schematically illustrates a y-z sectional view of a polarization selective device 800, according to another embodiment of the present disclosure. In the embodiment shown in FIG. 8A, the segmented waveplate 105 may be a first segmented waveplate 105 including a plurality of first wave plant segments, and the polarization selective device 800 may further include a second segmented waveplate 125 optically coupled to the PSOE 110 and configured to receive lights output from the PSOE 110. The second segmented waveplate 125 may be similar to the first segmented waveplate 105. For example, the second segmented waveplate 125 may function as a segmented SHWP 125 for the lights output from the PSOE 110. The second segmented SHWP 125 may include a plurality of second SHWP segments, e.g., 125-1, 125-2, 125-3, and 125-4, arranged in a 1D array or a 2D array. The second SHWP segments 125-1, 125-2, 125-3, and 125-4 may be optically coupled to (or aligned with) with corresponding polarization selective segments 110-1, 110-2, 110-3, and 110-4, respectively. In some embodiments, each of the second SHWP segments 125-1, 125-2, 125-3, and 125-4 and the corresponding one of the polarization selective segments 110-1, 110-2, 110-3, and 110-4 may have a substantially same size. The second SHWP segments 125-1, 125-2, 125-3, and 125-4 may be electrically coupled to corresponding power sources, respectively.

For illustrative purpose, FIG. 8A shows that a power source 156 is electrically coupled with the second SHWP segment 125-4. The power source 156 may also be electrically coupled to the second SHWP segments 125-1, 125-2, and 125-3. In some embodiments, individual power sources may be electrically coupled to the second SHWP segments 125-1, 125-2, 125-3, and 125-4, respectively. The controller 115 may be communicatively coupled with the second segmented SHWP 125. The controller 115 may individually or independently control the corresponding power sources coupled to the second SHWP segments 125-1, 125-2, 125-3, and 125-4, thereby individually or independently controlling the operation states of the second SHWP segments 125-1, 125-2, 125-3, and 125-4. The second segmented SHWP 125 may also be referred to as a second segmented polarization switch that is disposed at a light exiting side of the PSOE 110. Correspondingly, the second SHWP segments 125-1, 125-2, 125-3, and 125-4 may be referred to polarization switch segments.

In some embodiments, the controller 115 may control the corresponding power sources coupled to the second SHWP segments 125-1, 125-2, 125-3, and 125-4, such that the second SHWP segments 125-1, 125-2, 125-3, and 125-4 may output lights having a substantially same polarization. Thus, an overall output light of the polarization selective device 800 may have a substantially uniform polarization across the predetermined clear aperture 155 (not shown), e.g., an overall output light of the polarization selective device 800 may be substantially right-handed polarized or left-handed polarized cross the predetermined clear aperture 155.

FIG. 8B schematically illustrates a y-z sectional view of a polarization selective device 830, according to another embodiment of the present disclosure. In the embodiment shown in FIG. 8B, the PSOE 110 may be a first PSOE 110 include a plurality of first polarization selective segments 110-1, 110-2, 110-3 and 110-4. The polarization selective device 830 may further include a second PSOE 130 optically coupled to the first PSOE 110 (e.g., stacked with the first PSOE 110) and configured to receive lights output from the first PSOE 110. The second PSOE 130 may be similar to the first PSOE 110. For example, the second PSOE 130 may include a plurality of second polarization selective segments, e.g., 130-1, 130-2, 130-3, and 130-4, arranged in a 1D array or a 2D array. The second polarization selective segment 130-1, 130-2, 130-3, or 130-4 may include suitable sub-wavelength structures, liquid crystals, photo-refractive holographic materials, or any combination thereof. The second polarization selective segment 130-1, 130-2, 130-3, or 130-4 may be an active or a passive polarization selective segment. A power source 158 may be electrically coupled with the active polarization selective segments to provide voltages to the active polarization selective segments independently. In some embodiments, individual power sources may supply voltages to the second polarization selective segments 130-1, 130-2, 130-3, and 130-4 independently. In some embodiments, the controller 115 may be communicatively coupled with the second PSOE 130 to individually or independently control the volage(s) supplied to the active polarization selective segment (s).

In some embodiments, the second polarization selective segment 130-1, 130-2, 130-3, or 130-4 may be optically coupled to (or aligned with) with a corresponding first polarization selective segment 110-1, 110-2, 110-3, or 110-4. In some embodiments, the second polarization selective segment 130-1, 130-2, 130-3, or 130-4 and the corresponding first polarization selective segment 110-1, 110-2, 110-3, or 110-4 may have a substantially same size. In some embodiments, both the second polarization selective segment 130-1, 130-2, 130-3, or 130-4 and the corresponding first polarization selective segment 110-1, 110-2, 110-3, or 110-4 may be a same type of polarization selective segment, such as a polarization selective lens, grating, or prism, etc.

In some embodiments, when both the second polarization selective segment 130-1, 130-2, 130-3, or 130-4 and the corresponding first polarization selective segment 110-1, 110-2, 110-3, or 110-4 are a same type of polarization selective segment, the second polarization selective segment 130-1, 130-2, 130-3, or 130-4 and the corresponding first polarization selective segment 110-1, 110-2, 110-3, or 110-4 may have the same polarization selectivity or different polarization selectivities. In some embodiments, the second polarization selective segment 130-1, 130-2, 130-3, or 130-4 and the corresponding first polarization selective segment 110-1, 110-2, 110-3, or 110-4 may be different types of polarization selective segments. For example, one of the second polarization selective segment 130-1, 130-2, 130-3, or 130-4 and the corresponding first polarization selective segment 110-1, 110-2, 110-3, or 110-4 may include a polarization selective grating (e.g., a PBP grating), and the other of the second polarization selective segment 130-1, 130-2, 130-3, or 130-4 and the corresponding first polarization selective segment 110-1, 110-2, 110-3, or 110-4 may include a polarization selective lens (e.g., a PBP lens).

In some embodiments, when both the second polarization selective segment 130-1, 130-2, 130-3, or 130-4 and the corresponding first polarization selective segment 110-1, 110-2, 110-3, or 110-4 include polarization selective gratings (e.g., PBP gratings), the second polarization selective segment 130-1, 130-2, 130-3, or 130-4 and the corresponding first polarization selective segment 110-1, 110-2, 110-3, or 110-4 may be configured to diffract (or steer) a light along a same axis, such that the stack of the second polarization selective segment 130-1, 130-2, 130-3, or 130-4 and the corresponding first polarization selective segment 110-1, 110-2, 110-3, or 110-4 may be configured to increase a steering range of the input light 102 incident onto the stack. In some embodiments, the second polarization selective segment 130-1, 130-2, 130-3, or 130-4 and the corresponding first polarization selective segment 110-1, 110-2, 110-3, or 110-4 may be configured to diffract (or steer) a light along two different axes, respectively, such that the stack of the second polarization selective segment 130-1, 130-2, 130-3, or 130-4 and the corresponding first polarization selective segment 110-1, 110-2, 110-3, or 110-4 may diffract (or steer) the input light 102 incident onto the stack along two axes.

FIG. 8C schematically illustrates a y-z sectional view of a polarization selective device 850, according to another embodiment of the present disclosure. In the embodiment shown in FIG. 8C, the polarization selective device 850 may include a plurality of segmented waveplates and a plurality of polarization selective optical elements ("PSOEs") alternately arranged. For illustrative purposes, FIG. 8C shows that the polarization selective device 850 includes the first segmented waveplate 105, the first PSOE 110, the second segmented waveplate 125, and the second PSOE 130 alternately arranged. The segmented waveplate 105 or 125 may be configured to control local polarizations of a portion of the light 102 incident onto the corresponding segments of the PSOE 110 or 130. Descriptions of the first segmented waveplate 105, the first PSOE 110, the second segmented waveplate 125, and the second PSOE 130 can refer to the above corresponding descriptions, including those rendered in connection with FIGS. 1A-8B.

The disclosed polarization selective devices may be configured to output portions of an input light in different directions across a predetermined clear aperture, or to non-uniformly vary the local wavefronts of portions of an overall output light. The disclosed polarization selective devices may be implemented in systems or devices for manipulating light beams, such as diffraction optics, laser displays, beam shaping devices, beam steering devices, switchable holograms, wavefront shaping devices, aberration correction devices, and adaptive micro devices, etc. For example, beam steering devices based on the disclosed polarization selective devices may have features such as compactness, a high power efficiency, a large steering range with continuous beam steering or discrete beam steering, wavelength selectivity, angular selectivity and/or polarization selectivity, and polarization conversion in addition to beam steering. Beam steering devices based on the disclosed polarization selective devices may have numerous applications in a variety of fields. For example, beam steering devices based on the disclosed polarization selective devices may be implemented in displays and optical modules to enable pupil steered augmented reality ("AR"), virtual reality ("VR"), and/or mixed reality ("MR") display systems, such as holographic near eye displays, retinal projection eyewear, and wedged waveguide displays. Pupil steered AR, VR, and/or MR display systems have features such as compactness, a large field of view ("FOV"), a high system efficiency, and a small eye-box.

Beam steering devices based on the disclosed polarization selective devices may be implemented in the pupil steered AR, VR, and/or MR display systems to enlarge the eye-box spatially and/or temporally. In some embodiments, beam steering devices based on the disclosed polarization selective devices may be implemented in AR, VR, and/or MR sensing modules to detect objects in a wide angular range to enable other functions. In some embodiments, beam steering devices based on the disclosed polarization selective devices may be implemented in AR, VR, and/or MR sensing modules to extend the FOV (or detecting range) of the sensors, improve detecting resolution or accuracy of the sensors, and/or reduce the signal processing time. Beam steering devices based on the disclosed polarization selective devices may also be used in optical communications, e.g., to provide fast speed (e.g., speeds at the level of Gigabyte/second) and long range (e.g., ranges at kilometer levels), microwave communications, 3D imaging and sensing (e.g., Lidar), lithography, and 3D printing, etc.

In the disclosed embodiments, PBP elements are used as examples of the PSOE, and PBP segments having a circular polarization selectivity are used as examples to explain the principle of outputting portions of an input light in different directions across a predetermined clear aperture (or non-uniformly varying local propagation directions of local output lights and/or local wavefronts of local output lights). In some embodiments, the PSOE may also include suitable polarization selective segments other than the PBP segments, and the polarization selective segments may have a circular polarization selectivity, a linear polarization selectivity, or an elliptical polarization selectivity, etc. In some embodiments, the segmented polarization switch coupled to the PSOE may include a plurality of 90° twist-nematic liquid crystal ("TNLC") cells (or segments). The TNLC cell may have a light incidence surface and a light exiting surface providing substantially orthogonal alignment directions of LC directors. The alignment direction provided by the light incidence surface of the TNLC cell may be substantially parallel with the polarization direction of a linearly polarized input light. The polarization of the linearly polarized input light may be rotated by about 90° when the TNLC cell operates in the switching state, or may be maintained when the TNLC cell operates in the non-switching state. In some embodiments, the TNLC cell may operate in the switching state when a voltage supplied by a power source is lower than or equal to a predetermined threshold voltage, and operate in the non-switching state when the voltage is higher than the predetermined threshold voltage (and sufficiently high) to reorient the LC directors along the electric field direction.

Figure 9:
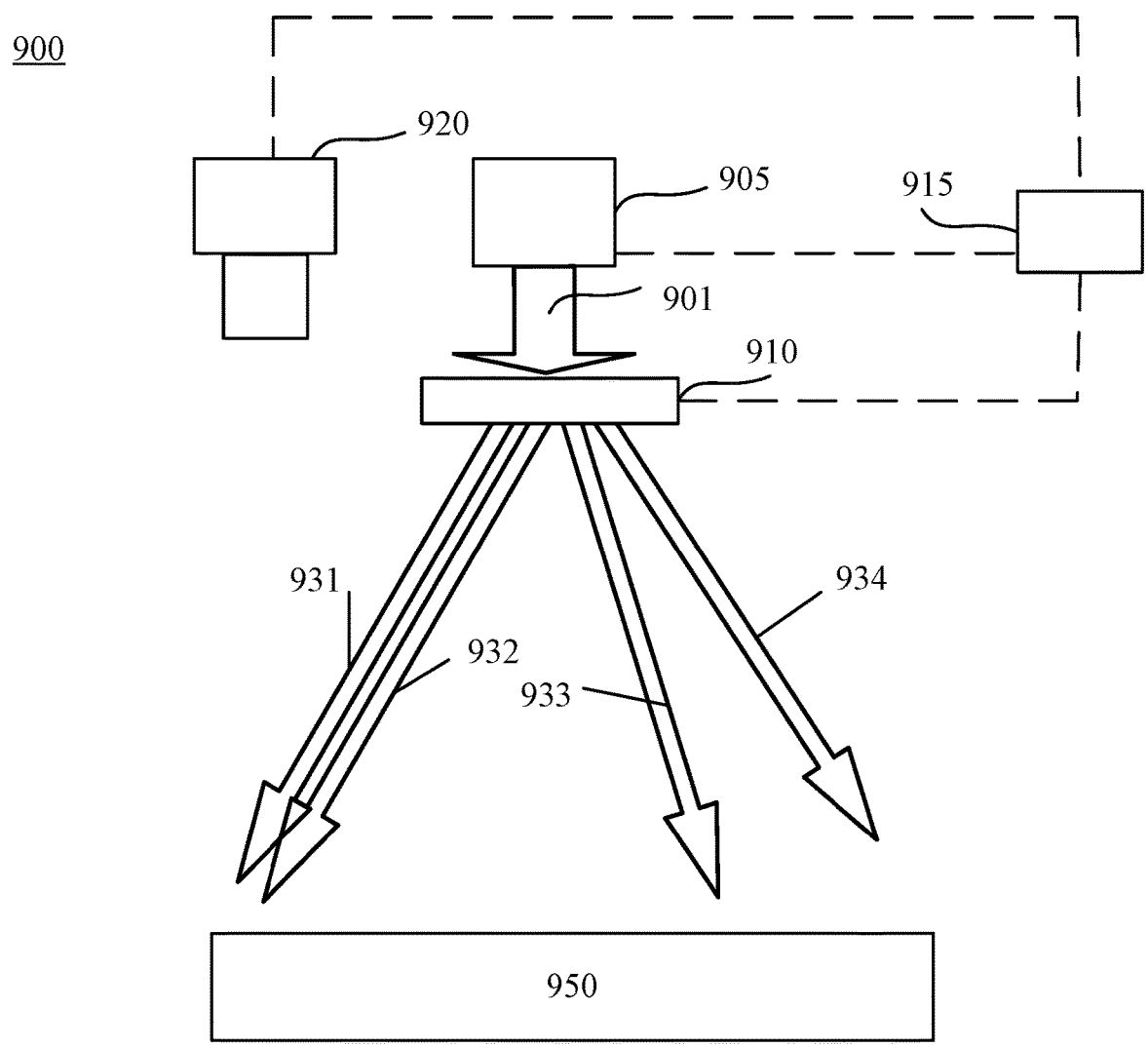
FIG. 9 schematically illustrates a diagram of a system including a polarization selective device, according to an embodiment of the present disclosure.
Figure 9:
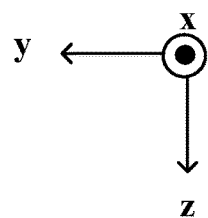

FIG. 9 schematically illustrates a diagram of a system 900, according to an embodiment of the present disclosure. In some embodiments, the system 900 may be a sensing system. The sensing system 900 may be implemented in 3D imaging and sensing (e.g., Lidar). As shown in FIG. 9, the system 900 may include a light source 905, a polarization selective device 910, an imaging device 920, and a controller 915. The controller 915 may be communicatively coupled with one or more of the other devices, such as the light source 905, the polarization selective device 910, and the imaging device 920. The controller 915 may be similar to the controller 115 shown in FIG. 1A.

The light source 905 may be configured to output a light 901 for illuminating an object 950. In some embodiments, the light source 905 may be an infrared ("IR") light source. In some embodiments, the light source 905 may be a near infrared ("NIR") light source, for example, the light source 905 may include a vertical-cavity surface-emitting laser ("VCSEL") array. In some embodiments, the light source 905 may be configured to output a light 901 having a wavelength in the range of 800 nm to 900 nm. In some embodiments, the controller 915 may be configured to control the light source 905 to output laser pulses in a predetermined frequency and/or a predetermined duty cycle. In some embodiments, the controller 915 may also be configured to vary the frequency and/or duty cycle of the lasers pulses according to various application scenarios.

The polarization selective device 910 may be optically couple to the light source 905. The polarization selective device 910 may be any polarization selective device disclosed herein, such as the polarization selective device 100 shown in FIGS. 1A and 1B, the polarization selective device 700 shown in FIG. 7A, the polarization selective device 730 shown in FIG. 7B, the polarization selective device 750 shown in FIG. 7C, the polarization selective device 780 shown in FIG. 7D, the polarization selective device 800 shown in FIG. 8A, the polarization selective device 830 shown in FIG. 8B, or the polarization selective device 850 shown in FIG. 8C. The polarization selective device 910 may be configured to modulate local propagating directions and/or local wavefronts (or waveforms) of the light 901 output from the light source 905.

In some embodiments, the polarization selective device 910 may be configured to simultaneously output a plurality of lights (e.g., 931, 932, 933, and 934) in any desirable directions across different regions of a predetermined clear aperture (not shown) based on the light 901 received from the light source 905. As a result, the lights output at local regions of the clear aperture may be non-uniformly varied. For example, the polarization selective device 910 may be configured to simultaneously steer the light 901 received from the light source 905 in a plurality of different steering angles or directions. As shown in FIG. 9, the polarization selective device 910 may be configured to simultaneously steer the light 901 received from the light source 905 as four output lights 931, 932, 933, and 934 having different steering angles. For example, the output lights 931 and 932 may have a sustainably same positive steering angle (i.e., substantially in the same steering direction), the output lights 933 and 934 may have different negative steering angles (i.e., in different steering directions). As shown in FIG. 9, the steering angles (or directions) of the output lights 931 and 932 may be different from the steering angles (or directions) of the output lights 933 and 934. In some embodiments, the four output lights 931, 932, 933, and 934 output from the polarization selective device 910 may have a substantially same light intensity.

In some embodiments, the controller 915 may be configured to individually or independently change the steering angles of the output lights 931, 932, 933, and 934, such that an area of interest may be scanned by the output lights 931, 932, 933, and/or 934 (or illuminated in a scanning manner). As the polarization selective device 910 is configured to simultaneously steer the light 901 received from the light source 905 to a plurality of directions as output lights 931, 932, 933, and 934 having different steering angles, different portions of the area of interest may be scanned simultaneously. Thus, the scanning time may be significantly reduced (e.g., reduced by 50%), and the scanning speed may be significantly increased. The output lights 931, 932, 933, and 934 may be referred to as modulated lights.

The imaging device 920 may be configured to capture images of the object 950 illuminated by the modulated lights 931, 932, 933, and/or 934 within a field of view of the imaging device 920. For example, the object 950 may reflect the modulated lights 931, 932, 933, and/or 934. The imaging device 920 may receive portions of the modulated lights 931, 932, 933, and/or 934 reflected by the object 950, and may generate images of the object 950 based on the received lights. The imaging device 920 may operate in a substantially same spectrum as the light source 905. In some embodiments, the imaging device 920 may include one or more IR optical sensors (e.g., IR cameras). In some embodiments, the imaging device 920 may include one or more NIR optical sensors (e.g., NIR cameras).

In some embodiments, the controller 915 may be configured to receive the images of the object 950 generated by the imaging device 920 and determine a range of distance from the imaging device 920 to the object 950. In some embodiments, the controller 915 may be configured to determine the propagation directions of the lights 931, 932, 933, and 934 and measure the time of flight ("TOF") associated with the lights 931, 932, 933, and/or 934 being reflected by the object 950. In some embodiments, the position and orientation of the imaging device 920 is presumed to be fixed. The controller 915 may be configured to generate a geo-referenced 3D image of an scanned area, based on the position and orientation of the imaging device 920, the propagation directions of the lights 931, 932, 933, and 934, and the TOF information.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
 a segmented polarization switch including a plurality of polarization switch segments arranged in an array, wherein the polarization switch segments are individually switchable between a switching state and a non-switching state;

a polarization selective optical element ("PSOE") optically coupled to the segmented polarization switch and including a plurality of polarization selective segments arranged side by side, wherein the plurality of polarization selective segments include a plurality of gratings configured with different in-plane pitches; and a controller configured to control the polarization switch segments to individually operate in the switching state or the non-switching state to control optical states of the polarization selective segments.

2. The device of claim 1, wherein the segmented polarization switch includes a segmented switchable half-wave plate ("SHWP"), and the polarization switch segments include SHWP segments.

3. The device of claim 2, further comprising:

a plurality of power sources configured to supply a plurality of voltages to the plurality of SHWP segments, wherein the controller is configured to control the power sources to supply the voltages to configure the SHWP segments to operate in the switching state or the non-switching state.

4. The device of claim 1, wherein the PSOE includes at least one of sub-wavelength structures, a birefringent material, or a photo-refractive holographic material.

5. The device of claim 1, wherein the PSOE is a Pancharatnam-Berry phase ("PBP") element, and the plurality of gratings configured with different in-plane pitches include a plurality of PBP gratings configured with different in-plane pitches.

6. The device of claim 5, wherein the PBP gratings include a passive PBP grating that is configured to operate in a first optical state to provide a first optical response to a first input light having a first polarization, or operate in a second optical state to provide a second optical response different from the first optical response to a second input light having a second polarization, the first polarization being orthogonal to the second polarization.

7. The device of claim 5, wherein the PBP gratings include an active PBP grating that is configured to operate in a first optical state to provide a first optical response to a first input light having a first polarization, a second optical state to provide a second optical response different from the first optical response to a second input light having a second polarization, or a third optical state to provide a substantially same optical response to the first input light and the second input light, the first polarization being orthogonal to the second polarization.

8. The device of claim 7, further comprising:

a plurality of first power sources configured to supply a plurality of first voltages to the plurality of polarization switch segments; and a plurality of second power sources configured to supply a plurality of second voltages to the plurality of PBP gratings, wherein the controller is configured to control the first power sources to supply the first voltages to configure each of the polarization switch segments to operate in the switching state or the non-switching state, and to control the second power sources to supply the second voltages to configure each of the PBP gratings to operate in the first optical state, the second optical state, or the third optical state.

9. The device of claim 1, wherein each of the gratings includes a birefringent film, and an orientation of an optic axis of the birefringent film varies periodically with a uniform in-plane pitch in at least one in-plane direction.

10. The device of claim 1, wherein the plurality of polarization selective segments further include a lens that includes a birefringent film, and an orientation of an optic axis of the birefringent film varies in at least two opposite in-plane directions from a center of the lens to opposite peripheries of the lens with a varying in-plane pitch.

11. The device of claim 1, wherein for an input light having a planar wavefront and substantially normally incident onto the device, the segmented polarization switch and the PSOE are configured to output a plurality of output lights propagating in different directions at different regions across a predetermined clear aperture.

12. The device of claim 1, wherein for an input light having a planar wavefront and substantially normally incident onto the device, the segmented polarization switch and the PSOE are configured to non-uniformly vary local wavefronts of a plurality of portions of an output light at a plurality of regions across a predetermined clear aperture.

13. The device of claim 1, wherein the segmented polarization switch is a first segmented polarization switch, the polarization switch segments are first polarization switch segments, and the device further comprises:

a second segmented polarization switch optically coupled to the PSOE and including a plurality of second polarization switch segments, the second segmented polarization switch being configured to receive lights output from the PSOE; and a plurality of power sources configured to supply a plurality of voltages to the plurality of second polarization switch segments, wherein the controller is configured to control the power sources to supply the voltages to configure the second polarization switch segments to operate in the switching state or the non-switching state.

14. The device of claim 1, wherein the PSOE is a first PSOE, the polarization selective segments are first polarization selective segments, and the device further comprises:

a second PSOE optically coupled to the first PSOE and including a plurality of second polarization selective segments, the second PSOE being configured to receive lights output from the first PSOE.

15. The device of claim 1, wherein the PSOE is a first PSOE, the polarization selective segments are first polarization selective segments, and the device further comprises:

a second segmented polarization switch optically coupled to the first PSOE and including a plurality of second polarization switch segments, the second segmented polarization switch being configured to receive lights output from the first PSOE; and a second PSOE optically coupled to the second segmented polarization switch and including a plurality of second polarization selective segments, the second PSOE being configured to receive lights output from the second segmented polarization switch.

16. A system, comprising:

an infrared light source configured to output an infrared light;

a polarization selective device optically coupled to the infrared light source and configured to modulate the infrared light and output a modulated infrared light to illuminate an object, the polarization selective device including:

a segmented polarization switch including a plurality of polarization switch segments arranged in an array, wherein the polarization switch segments are individually switchable between a switching state and a non-switching state;

a polarization selective optical element ("PSOE") optically coupled to the segmented polarization switch and including a plurality of polarization selective segments; and a controller configured to control the polarization switch segments to individually operate in the switching state or the non-switching state to control optical states of the polarization selective segments; and an imaging device configured to receive the modulated infrared light reflected by the object and generate an image of the object based on the received modulated infrared light reflected by the object.

17. The system of claim 16, wherein the segmented polarization switch includes a segmented switchable half-wave plate ("SHWP"), and the polarization switch segments include SHWP segments.

18. The system of claim 16, wherein the PSOE includes at least one of sub-wavelength structures, a birefringent material, or a photo-refractive holographic material.

19. The system of claim 16, wherein the PSOE includes a birefringent material, an optic axis of the birefringent material being configured with an orientation spatially varying in at least one in-plane direction.

20. The device of claim 1, wherein the gratings are configured with increasing in-plane pitches.

\* \* \* \* \*